US011285866B2

(12) United States Patent
Sobecki et al.

(10) Patent No.: US 11,285,866 B2
(45) Date of Patent: *Mar. 29, 2022

(54) VEHICULAR GROUND ILLUMINATION AND ICON PROJECTION MODULE

(71) Applicant: Magna Mirrors of America, Inc., Holland, MI (US)

(72) Inventors: Justin E. Sobecki, Rockford, MI (US); Gregory A. Huizen, Hudsonville, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,771

(22) Filed: Aug. 17, 2020

(65) Prior Publication Data

US 2020/0377008 A1 Dec. 3, 2020

Related U.S. Application Data

(63) Continuation of application No. 16/461,002, filed as application No. PCT/IB2017/057462 on Nov. 28, 2017, now Pat. No. 10,744,930.

(Continued)

(51) Int. Cl.
*B60Q 1/26* (2006.01)
*B60R 1/06* (2006.01)
(Continued)

(52) U.S. Cl.
CPC ......... *B60Q 1/2665* (2013.01); *B60Q 1/2696* (2013.01); *B60R 1/06* (2013.01);
(Continued)

(58) Field of Classification Search
None
See application file for complete search history.

(56) References Cited

U.S. PATENT DOCUMENTS 5,371,659 A  12/1994 Pastrick et al.
5,497,305 A   3/1996 Pastrick et al.
(Continued)

OTHER PUBLICATIONS

International Search Report and Written Opinion dated Mar. 9, 2018 for corresponding PCT Application No. PCT/IB2017/057462.

*Primary Examiner* — Srinivas Sathiraju
(74) *Attorney, Agent, or Firm* — Honigman LLP

(57) ABSTRACT

A vehicular ground illumination module includes first, second and third icon LEDs, and first, second and third masks associated with respective ones of the first, second and third LEDs. A ground illumination LED and a freeform optic of the module function to, when the ground illumination LED electrically powered, illuminate the ground adjacent the side of the vehicle at which the module is mounted, with a ground illumination region of the ground being illuminated at a ground illumination intensity and an icon region of the ground being illuminated at an icon illumination intensity that is less than the ground illumination intensity. When the first, second and third icon LEDs are individually electrically powered to emit light, light emitted by the LEDs passes through the respective masks to project first, second and third projected images that provide animated images at the icon region of the ground adjacent the vehicle.

34 Claims, 23 Drawing Sheets

Related U.S. Application Data

(60) Provisional application No. 62/426,806, filed on Nov. 28, 2016.

(51) Int. Cl.

| | | |
|---|---|---|
| *B60R 1/12* | (2006.01) | |
| *F21V 5/04* | (2006.01) | |
| *F21V 9/08* | (2018.01) | |
| *G02B 19/00* | (2006.01) | |
| *G03B 21/00* | (2006.01) | |
| *G02B 3/00* | (2006.01) | |
| *G03B 21/20* | (2006.01) | |
| *F21S 43/20* | (2018.01) | |
| *F21S 43/14* | (2018.01) | |
| *G03B 29/00* | (2021.01) | |
| *G02B 7/02* | (2021.01) | |
| *F21S 43/50* | (2018.01) | |
| *F21Y 113/13* | (2016.01) | |
| *F21Y 115/10* | (2016.01) | |
| *F21W 104/00* | (2018.01) | |
| *F21W 107/10* | (2018.01) | |

(52) U.S. Cl.
CPC .......... *B60R 1/1207* (2013.01); *F21S 43/14* (2018.01); *F21S 43/26* (2018.01); *F21S 43/51* (2018.01); *F21V 5/04* (2013.01); *F21V 9/08* (2013.01); *G02B 3/0037* (2013.01); *G02B 3/0075* (2013.01); *G02B 7/021* (2013.01); *G02B 19/0066* (2013.01); *G03B 21/001* (2013.01); *G03B 21/2033* (2013.01); *G03B 29/00* (2013.01); *B60Q 2400/50* (2013.01); *B60R 2001/1215* (2013.01); *F21W 2104/00* (2018.01); *F21W 2107/10* (2018.01); *F21Y 2113/13* (2016.08); *F21Y 2115/10* (2016.08)

(56) References Cited

U.S. PATENT DOCUMENTS

| | | |
|---|---|---|
| 5,497,306 A | 3/1996 | Pastrick |
| 5,669,699 A | 9/1997 | Pastrick et al. |
| 5,786,772 A | 7/1998 | Schofield et al. |
| 5,823,654 A | 10/1998 | Pastrick et al. |
| 5,929,786 A | 7/1999 | Schofield et al. |
| 6,176,602 B1 | 1/2001 | Pastrick et al. |
| 6,198,409 B1 | 3/2001 | Schofield et al. |
| 6,227,689 B1 | 5/2001 | Miller |
| 6,276,821 B1 | 8/2001 | Pastrick et al. |
| 6,315,419 B1 | 11/2001 | Platzer, Jr. |
| 6,349,450 B1 | 2/2002 | Koops et al. |
| 6,522,451 B1 | 2/2003 | Lynam |
| 6,550,103 B2 | 4/2003 | Koops et al. |
| 6,582,109 B2 | 6/2003 | Miller |
| 6,690,268 B2 | 2/2004 | Schofield et al. |
| 6,717,712 B2 | 4/2004 | Lynam et al. |
| 7,097,312 B2 | 8/2006 | Platzer, Jr. |
| 7,126,456 B2 | 10/2006 | Boddy et al. |
| 7,195,381 B2 | 3/2007 | Lynam et al. |
| 7,255,451 B2 | 8/2007 | McCabe et al. |
| 7,289,037 B2 | 10/2007 | Uken et al. |
| 7,492,281 B2 | 2/2009 | Lynam et al. |
| 7,581,859 B2 | 9/2009 | Lynam |
| 7,626,749 B2 | 12/2009 | Baur et al. |
| 7,629,400 B2 | 12/2009 | Hyman |
| 7,748,856 B2 | 7/2010 | Zhao |
| 7,944,371 B2 | 5/2011 | Foote et al. |
| 8,058,977 B2 | 11/2011 | Lynam |
| 8,100,540 B2 * | 1/2012 | Huebner ............... B60K 35/00 353/94 |
| 8,113,695 B2 | 2/2012 | Meinke et al. |
| 8,764,256 B2 | 7/2014 | Foote et al. |
| 8,786,401 B2 | 7/2014 | Sobecki et al. |
| 8,786,704 B2 | 7/2014 | Foote et al. |
| 8,801,245 B2 * | 8/2014 | De Wind ............ B60Q 1/0011 362/511 |
| 9,016,910 B2 * | 4/2015 | Bingle ..................... B60Q 3/14 362/459 |
| 9,072,133 B2 * | 6/2015 | Chemel ................... F21S 2/005 |
| 9,321,395 B2 * | 4/2016 | Ammar ..................... B60Q 1/24 |
| 9,346,403 B2 * | 5/2016 | Uken ..................... G06F 3/0412 |
| 9,759,917 B2 * | 9/2017 | Osterhout .......... G02B 27/0093 |
| 10,094,530 B2 * | 10/2018 | Bhakta ..................... F21V 9/30 |
| 10,222,474 B1 * | 3/2019 | Raring ................ H01S 5/02212 |
| 10,438,702 B2 | 10/2019 | Tuszewski et al. |
| 10,440,806 B2 | 10/2019 | Binderbauer et al. |
| 10,473,284 B2 * | 11/2019 | Bhakta ..................... F21V 13/14 |
| 10,744,930 B2 | 8/2020 | Sobecki et al. |
| 2003/0035917 A1 | 2/2003 | Hyman |
| 2010/0007463 A1 | 1/2010 | Dingman et al. |
| 2010/0088855 A1 | 4/2010 | Ruse et al. |
| 2010/0277696 A1 * | 11/2010 | Huebner ................ G03B 21/00 352/81 |
| 2010/0302779 A1 * | 12/2010 | Chemel ................. H05B 47/155 362/249.02 |
| 2013/0130674 A1 * | 5/2013 | De Wind ............... B60Q 1/2665 455/420 |
| 2013/0242586 A1 | 9/2013 | Huizen et al. |
| 2014/0191859 A1 | 7/2014 | Koelsch |
| 2014/0320823 A1 * | 10/2014 | Ammar .................. G03B 29/00 353/13 |
| 2015/0022994 A1 * | 1/2015 | Bingle .................... G01D 13/20 362/23.01 |
| 2015/0138794 A1 | 5/2015 | Salter et al. |
| 2015/0224919 A1 | 8/2015 | Sobecki et al. |
| 2015/0360606 A1 * | 12/2015 | Thompson .............. B60Q 3/54 362/490 |
| 2016/0193957 A1 * | 7/2016 | De Wind ............... B60Q 1/323 362/23.12 |
| 2016/0264054 A1 * | 9/2016 | Uken ...................... B60R 1/088 |
| 2017/0050558 A1 | 2/2017 | Salter et al. |
| 2017/0106836 A1 | 4/2017 | Sobecki et al. |
| 2017/0365111 A1 | 12/2017 | Dudar et al. |
| 2018/0232048 A1 * | 8/2018 | Popovich .............. G02F 1/2955 |
| 2018/0334108 A1 * | 11/2018 | Rotzer ................ G06K 9/00791 |
| 2019/0041634 A1 * | 2/2019 | Popovich .............. G02B 6/0035 |
| 2019/0104285 A1 * | 4/2019 | Medvec ................ H04N 9/3161 |
| 2019/0106051 A1 | 4/2019 | Huizen et al. |
| 2019/0179015 A1 * | 6/2019 | Raring ................ H01S 5/02325 |
| 2019/0244040 A1 * | 8/2019 | Herrmann ............. G06K 9/4604 |
| 2019/0270403 A1 * | 9/2019 | Sobecki ................. G02B 7/021 |
| 2019/0293255 A1 * | 9/2019 | Meijers .................. B29C 45/16 |
| 2019/0324362 A1 | 10/2019 | Favero et al. |

\* cited by examiner

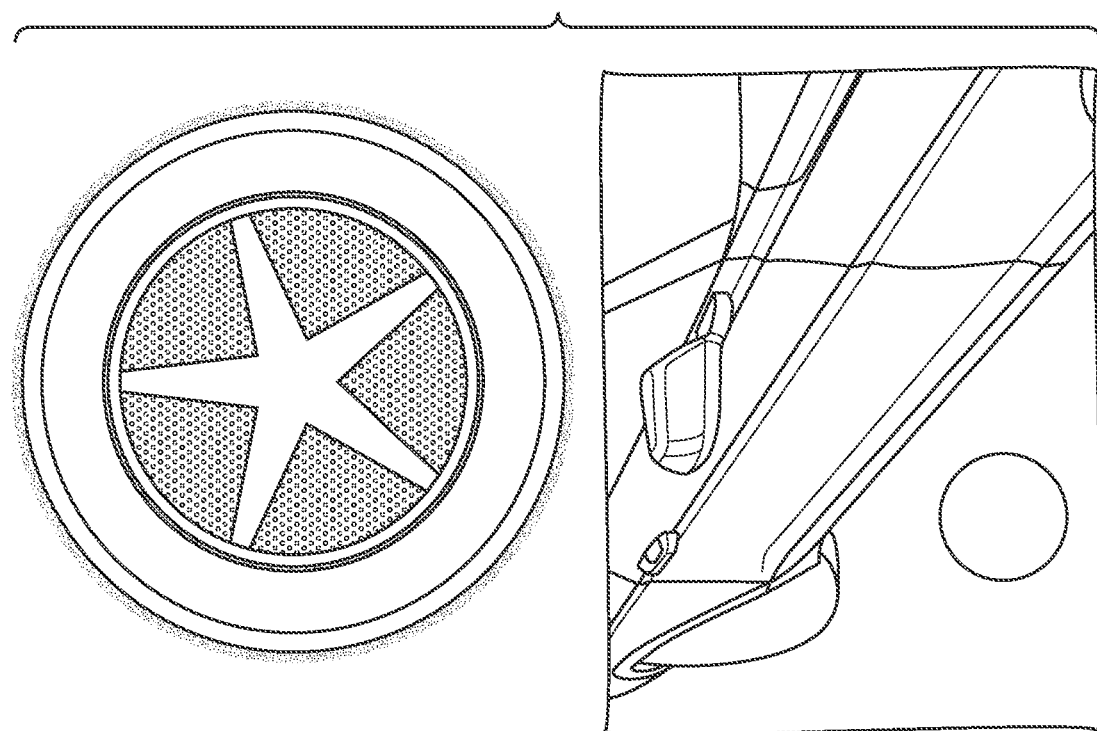

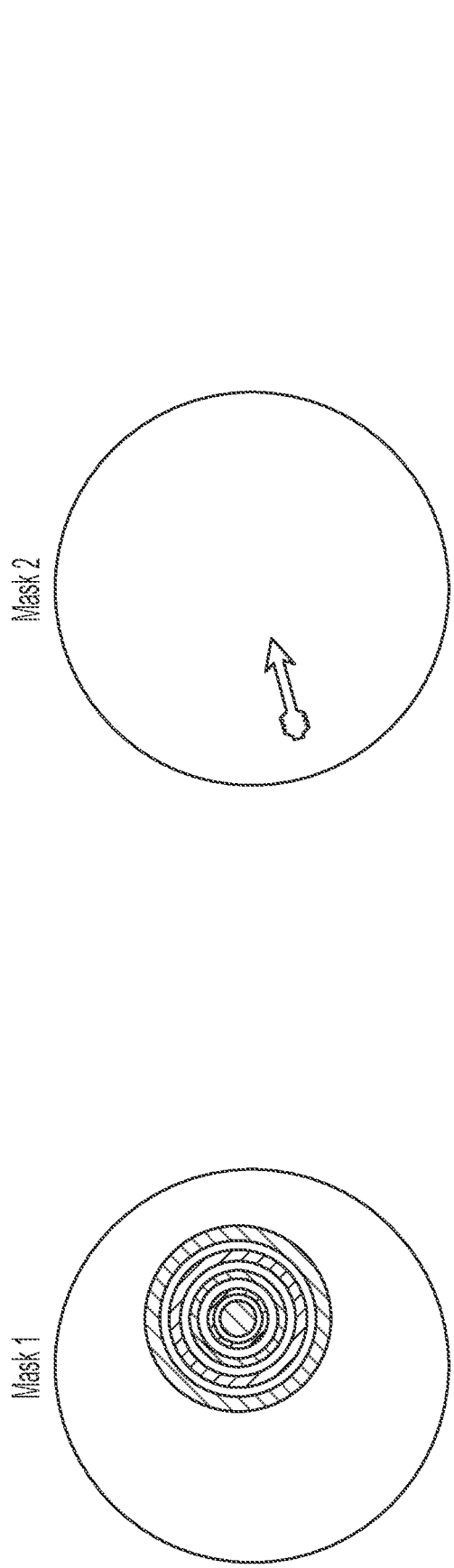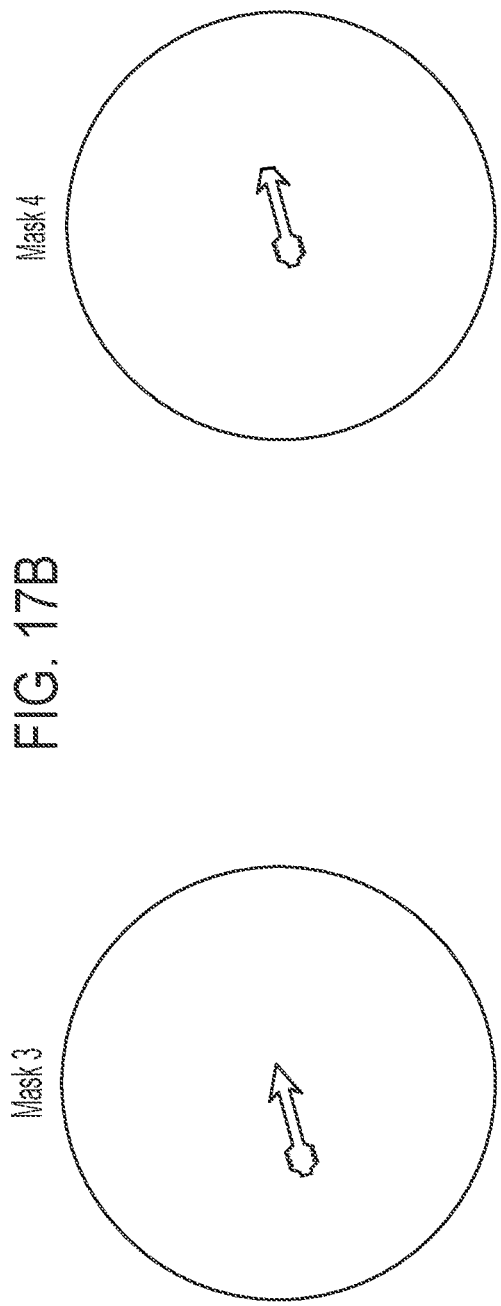
FIG. 17A  FIG. 17B  FIG. 17C  FIG. 17D

US 11,285,866 B2

VEHICULAR GROUND ILLUMINATION AND ICON PROJECTION MODULE

CROSS REFERENCE TO RELATED APPLICATIONS

The present application is a continuation of U.S. patent application Ser. No. 16/461,002, filed May 15, 2019, now U.S. Pat. No. 10,744,930, which is a 371 national phase filing of PCT Application No. PCT/162017/057462, filed Nov. 28, 2017, which claims the filing benefits of U.S. provisional application Ser. No. 62/426,806, filed Nov. 28, 2016, which is hereby incorporated herein by reference in its entirety.

FIELD OF THE INVENTION

The present invention relates to illumination modules for vehicles and, more particularly, to an illumination module that projects an icon or image onto the ground at or near the vehicle.

BACKGROUND OF THE INVENTION

It is known to provide illumination or light sources at the side of the vehicle, such as to provide security lighting or convenience lighting at the side of the vehicle. For example, such lighting devices are described in U.S. Pat. Nos. 6,349,450; 6,550,103; 5,371,659; 5,669,699; 5,823,654 and 5,497,305, which are hereby incorporated herein by reference in their entireties. Typically, such lighting devices provide illumination along the side of the vehicle and down to the ground at the side of the vehicle.

SUMMARY OF THE INVENTION

The present invention provides an illumination module or device for a vehicle, such as for an exterior mirror assembly, for providing illumination at the side or door of the vehicle and for projecting an icon or logo onto the ground area at the side of the vehicle.

According to an aspect of the present invention, an illumination module utilizes two or more illumination sources (such as three light emitting diodes (LEDs)), such as a red light emitting LED, a green light emitting LED and a blue light emitting LED, and three unique masks that, when aligned with the respective LED, project the respective colored images onto a ground region, such that the colored images overlap at the ground area to create a multi-color/full color projected image of a logo or indicia or icon or the like.

According to another aspect of the present invention, an illumination module may be operable to project or emit a large-scale (such as a 'premium') logo. Such a large-scale logo may provide both ground illumination and an enlarged logo projected onto the ground area along the side of the vehicle.

According to another aspect of the present invention, an illumination module provides lighting at the ground along the exterior side of the vehicle and projects an icon or indicia or logo or the like onto the ground at or near the side of the vehicle. The illumination module includes an optic (such as a lens optic or reflector optic) that is designed via an algorithm that generates the optic that provides ground illumination and/or a projected icon or logo or indicia, with a single formed optic or lens and without masking of the optic or lens or illumination source.

These and other objects, advantages, purposes and features of the present invention will become apparent upon review of the following specification in conjunction with the drawings.

BRIEF DESCRIPTION OF THE DRAWINGS

FIG. 4 shows two tone projected icons;

FIGS. 17A-D are images of four masks used to project the images shown in FIGS. 15A-C;

DESCRIPTION OF THE PREFERRED EMBODIMENTS

Figure 1:
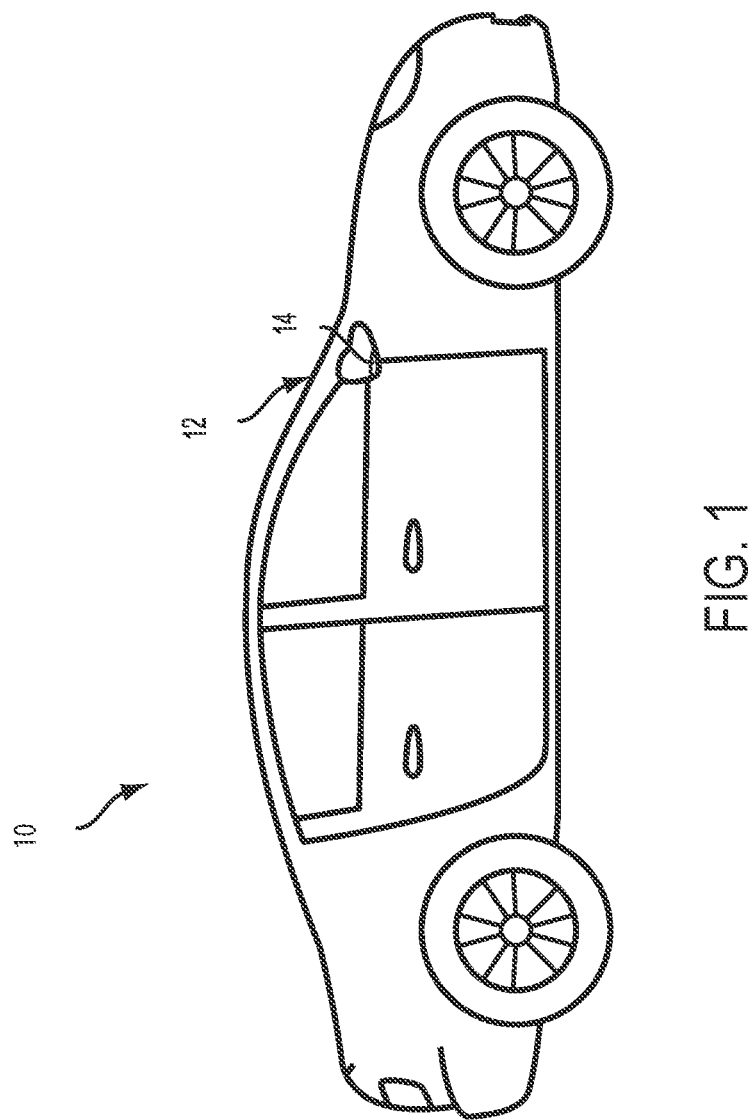
FIG. 1 is a side view of a vehicle with an illumination and projection light module at the exterior rearview mirror of the vehicle in accordance with the present invention.

Referring now to the drawings and the illustrative embodiments depicted therein, an illumination module 14 may be disposed at a vehicle exterior rearview mirror assembly 12 or the like at a side and exterior portion of a vehicle 10, with the illumination module 14 providing (a) projection or backlighting of an image or icon or logo or indicia and (b) ground illumination. Illumination module 14 includes a housing or casing that is configured to be received (and optionally snapped or otherwise secured) at or in an opening of the mirror assembly (or elsewhere at the vehicle, such as at a door handle assembly or underbody of the vehicle such as below a driver or passenger side door or the like), with an outer portion or cover being at or generally flush with the outer surface of the mirror assembly or door handle or vehicle body portion at which the illumination module is mounted. The illumination module may utilize aspects of the illumination modules described in U.S. Pat. No. 8,801,245 and/or U.S. Publication No. US-2015-0224919 and/or U.S. provisional application Ser. No. 62/570,211, filed Oct. 10, 2017, which are hereby incorporated herein by reference in its entirety.

In accordance with an aspect of the present invention, the module may be operable to project a multi-color logo or icon. For example, and such as can be seen with reference to FIGS. 2-14, the module be operable to project different colors via different glass masks that are paired with an appropriate colored light emitting diode (LED), such as a respective red, green and blue LED. When the projected three different colored images are properly aligned, the module projects a multicolored projected image or icon or logo or indicia at the ground area. The image alignment (FIG. 3) may be handled by offsetting the images at the image plane (i.e., the mask). Optionally, all three masks may be "printed" on one mask and/or all three projection lenses may be made into one lens. Rotational orientation of the single mask may be controlled and tuned.

Figure 2:
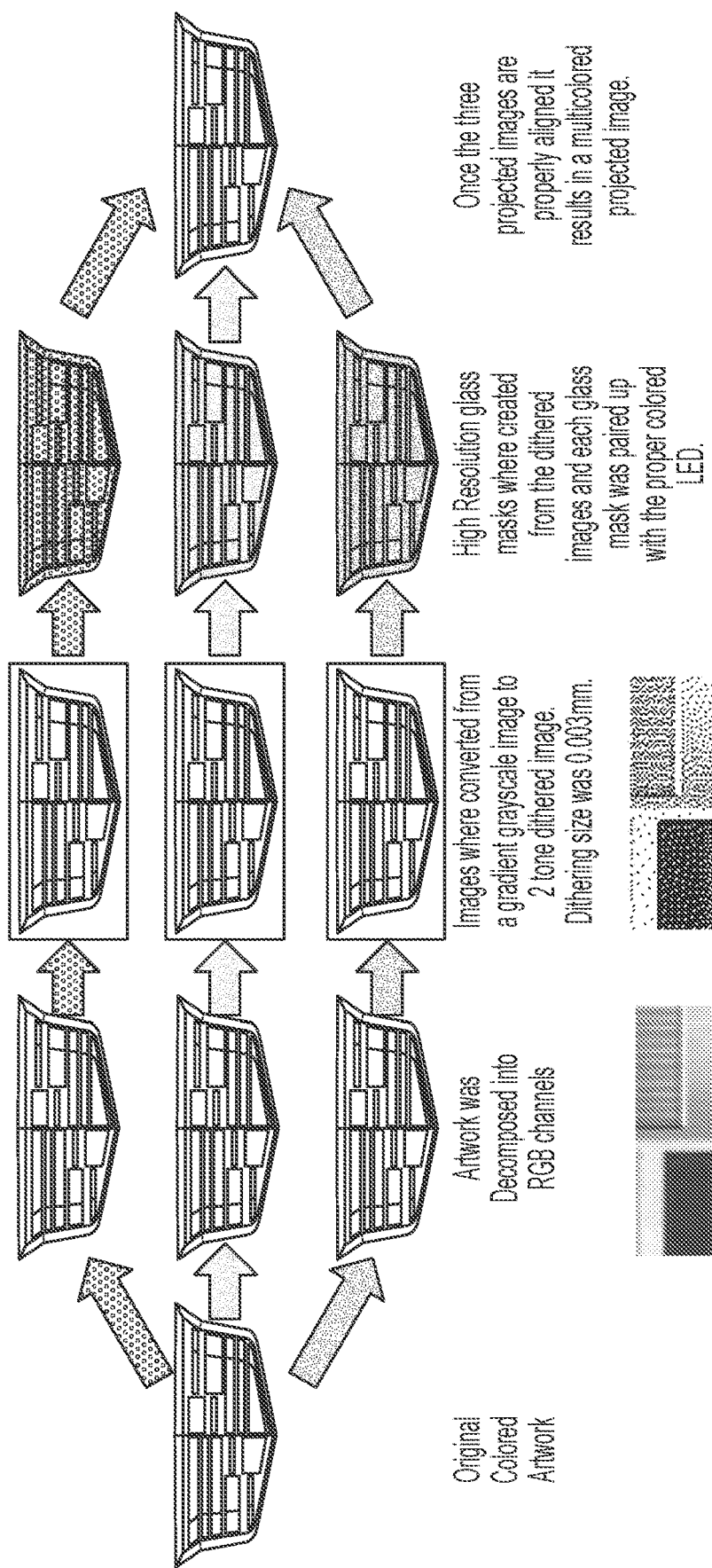
FIG. 2 is a schematic showing the process of generating a colored projected image in accordance with the present invention.
Figure 3:
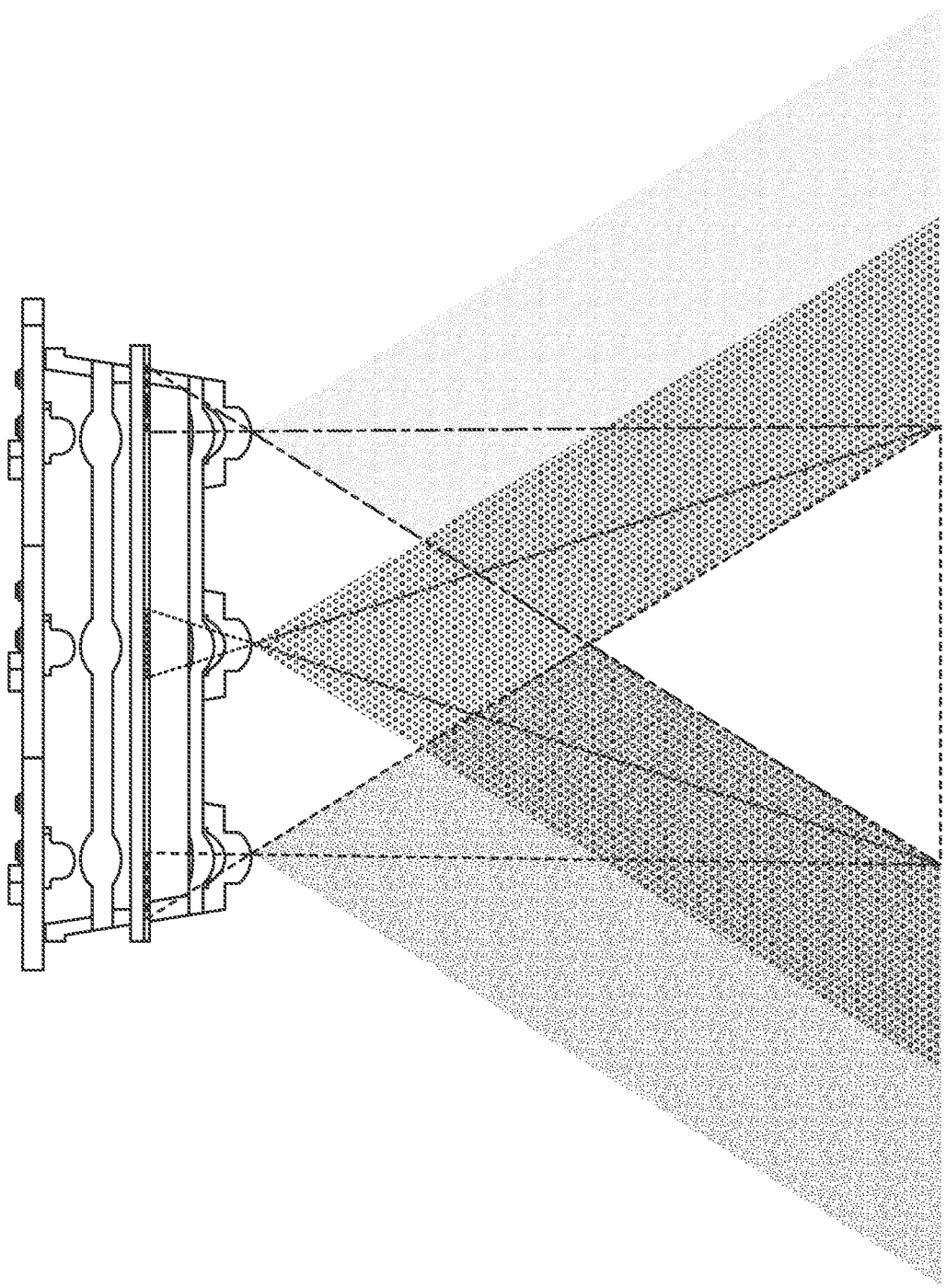
FIG. 3 is a plan view of an illumination module operable to project a colored image.

As shown in FIG. 2, the original colored artwork of a logo or indicia or the like is separated into three different versions of the logo or indicia, one for red colored portions, one for green colored portions and one for blue colored portions. The three differently colored logos are used to create high resolution glass masks (created from dithered images of the respective RGB images or channels). The glass masks are paired up with a proper or selected colored light emitting diode. For example, a glass mask derived from the red artwork element is paired with one or more red light-emitting LEDs, a glass mask derived from the green artwork element is paired with one or more green light-emitting LEDs, and a glass mask derived from the blue artwork element is paired with one or more blue light-emitting LEDs. When all three LEDs are electrically powered to emit light that projects through the respective mask element and onto a surface (where the three projected images overlap one another), a multi-colored image is projected at and viewable at the surface.

The illumination module may provide benefits over a white two tone projection light (see FIG. 4), and may use a new projection lens for each color (such as red, green and blue). The illumination module thus may provide increased sharpness in the projected image and may reduce the number of projection lenses (such as from two to one). When the masks are aligned, the illumination module may reduce the effects of chromatic aberration. The colors may be selected and may be adjusted or changed to provide a desired colored projected image or icon or logo.

Figure 5A:
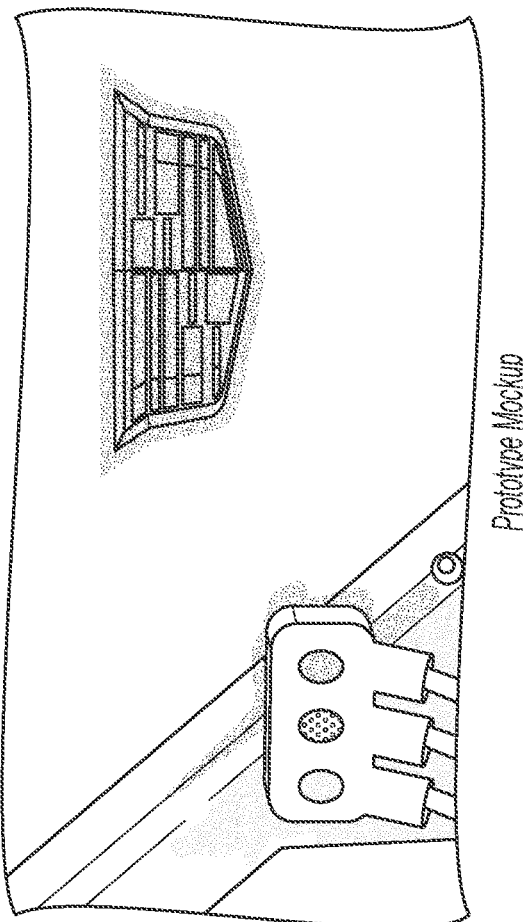
FIGS. 5 and 5A show a three color mask and alignment of the masks to create or project a full-color logo or image.
Figure 5:
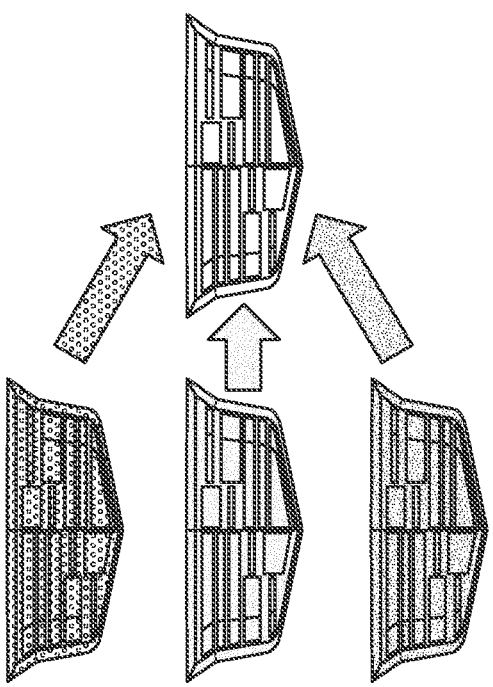
Figure 8:
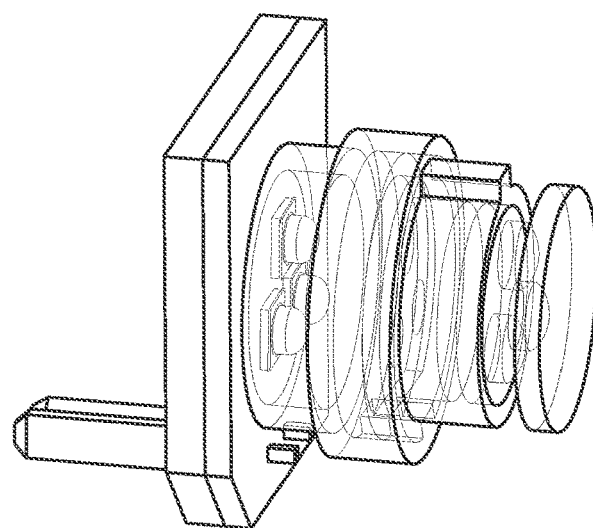
FIG. 8 is a perspective view of the multi-color projection light module of FIG. 7, with the housing removed to show additional detail.
Figure 7:
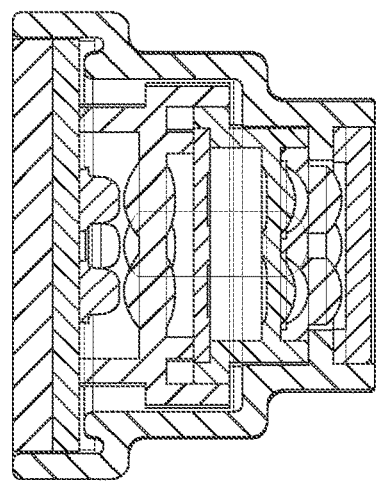
FIG. 7 is a sectional view of the multi-color projection light module of FIG. 6.
Figure 6:
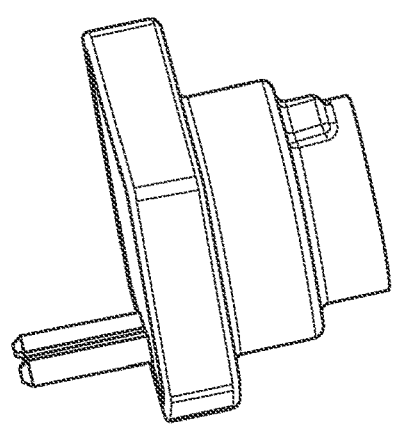
FIG. 6 is a perspective view of a multi-color projection light module of the present invention.

As shown in FIGS. 5 and 5A, the multi-color projection logo light utilizes alignment and overlap of unique masks to red, green, and blue LEDs to create a full-color or multi-colored logo/icon/indicia image at a ground surface.

Figure 9:
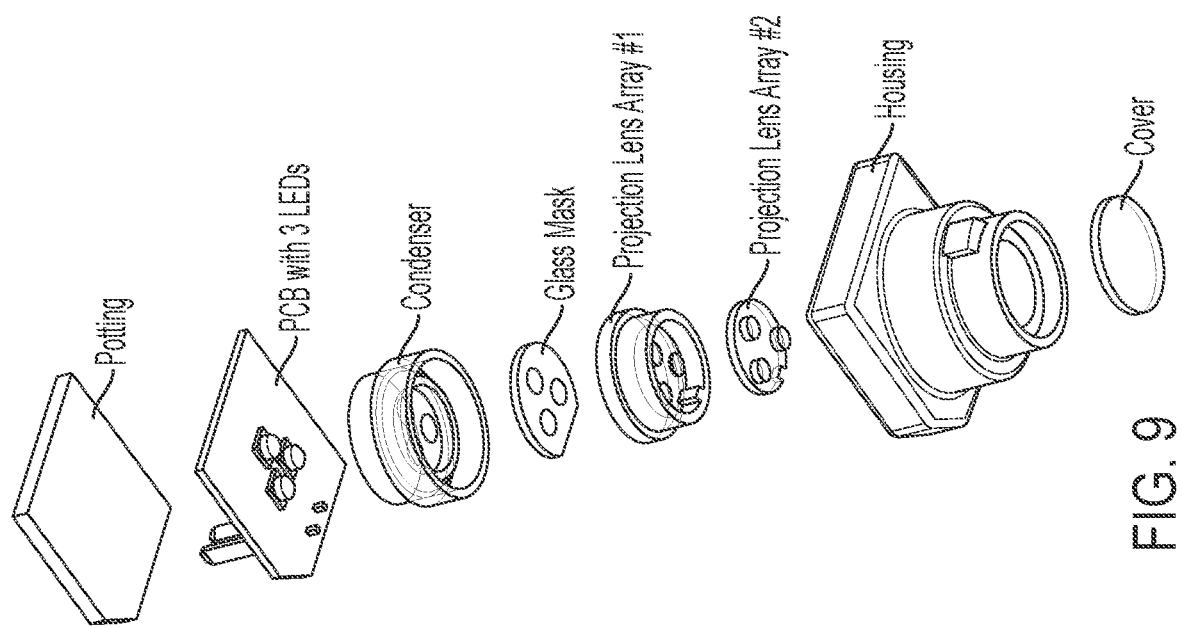
FIG. 9 is an exploded perspective view of the multi-color projection light module of FIG. 6.
Figure 10B:
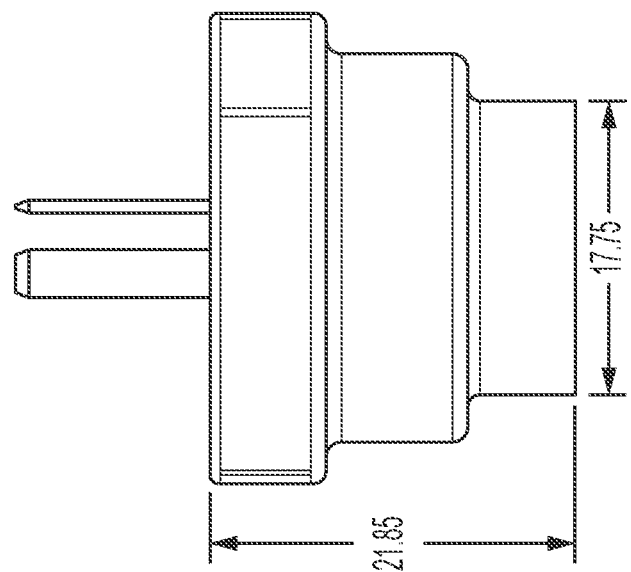
FIGS. 10A and 10B are views of the multi-color projection light module, showing exemplary dimensions of the module.
Figure 10A:
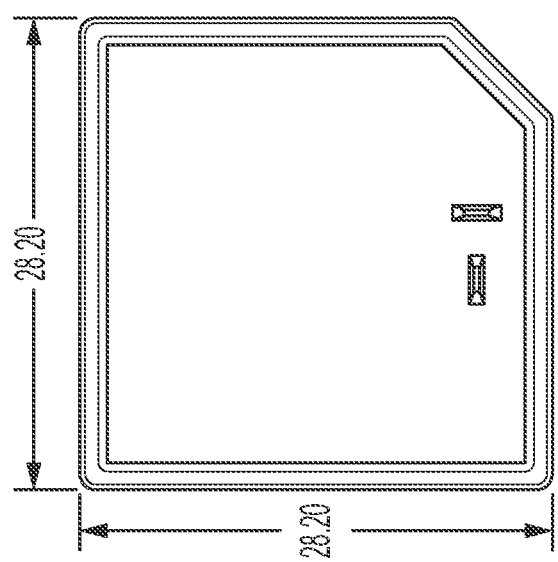
Figure 11:
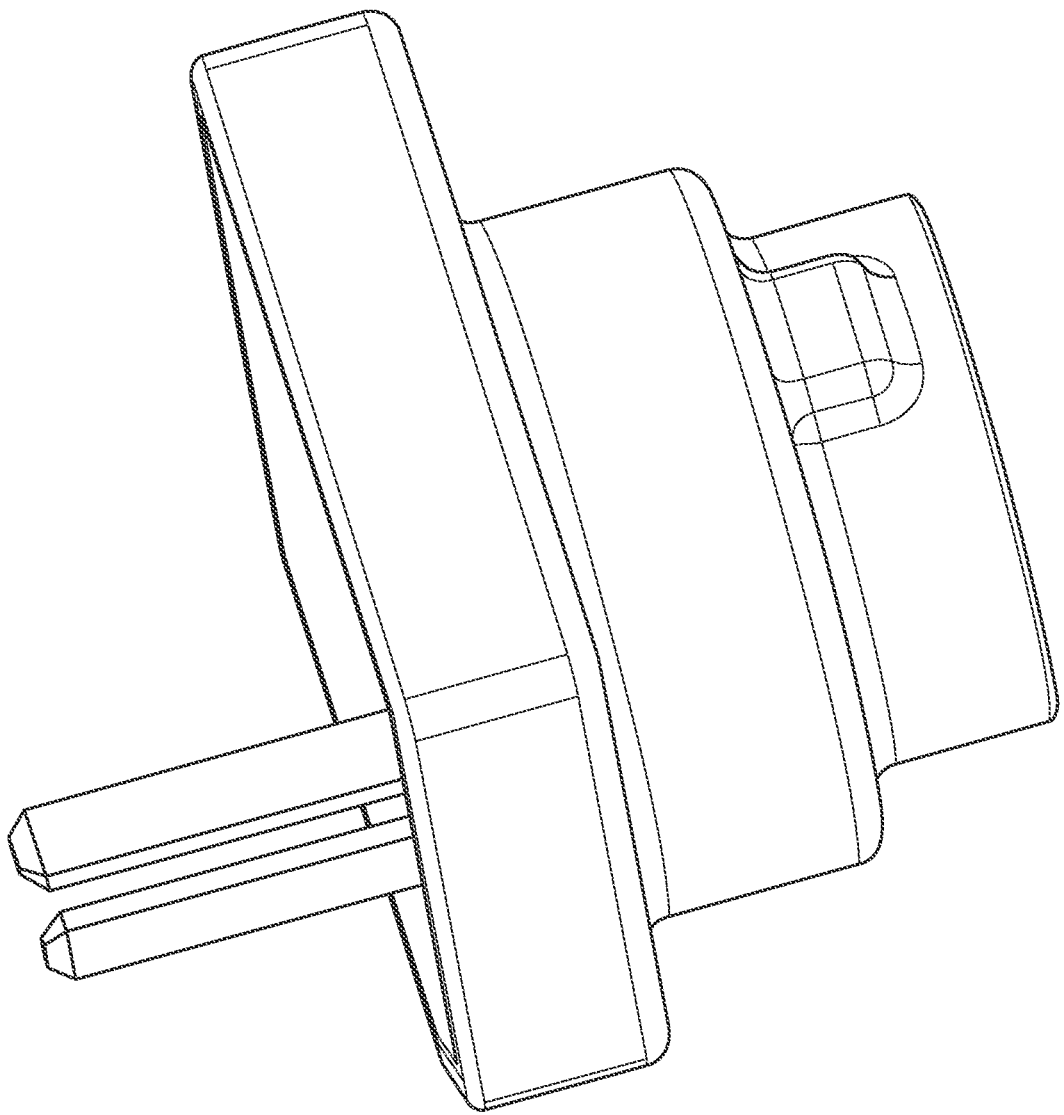
FIG. 11 is another perspective view of the multi-color projection light module of the present invention.
Figure 12:
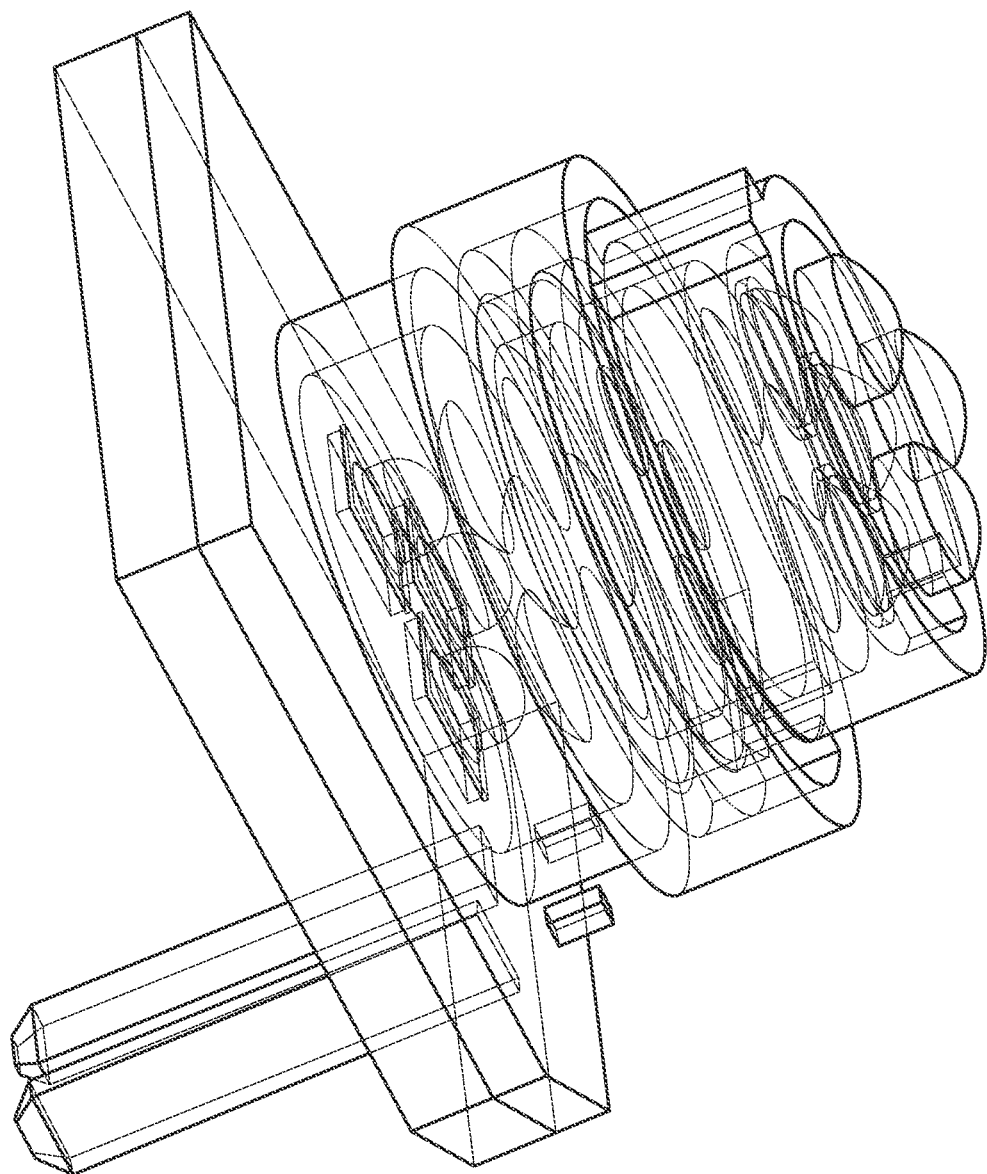
FIG. 12 is a perspective view of the multi-color projection light module of FIG. 11, with the housing removed to show additional detail.
Figure 13:
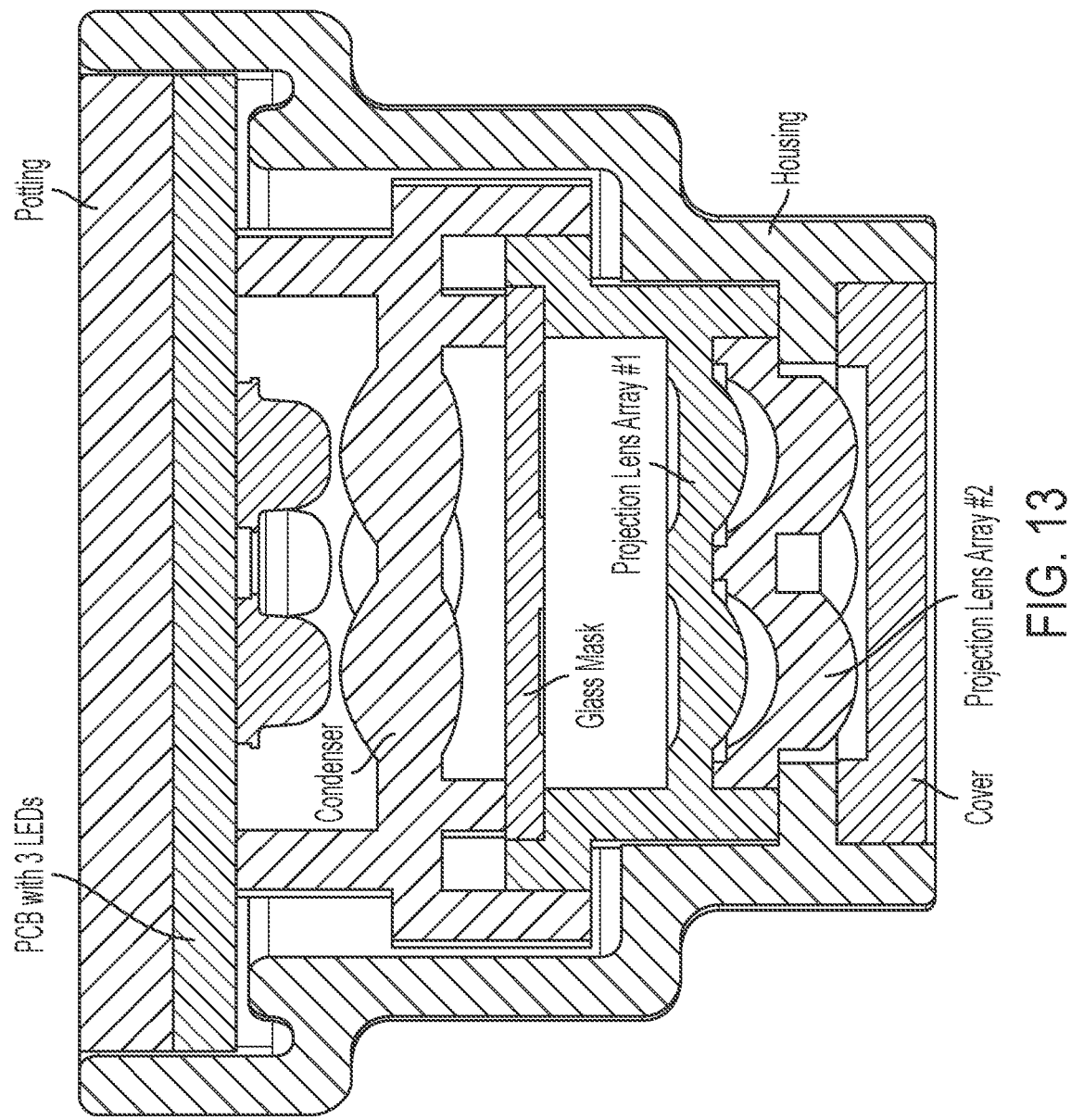
FIG. 13 is a sectional view of the multi-color projection light module of FIG. 11.
Figure 14:
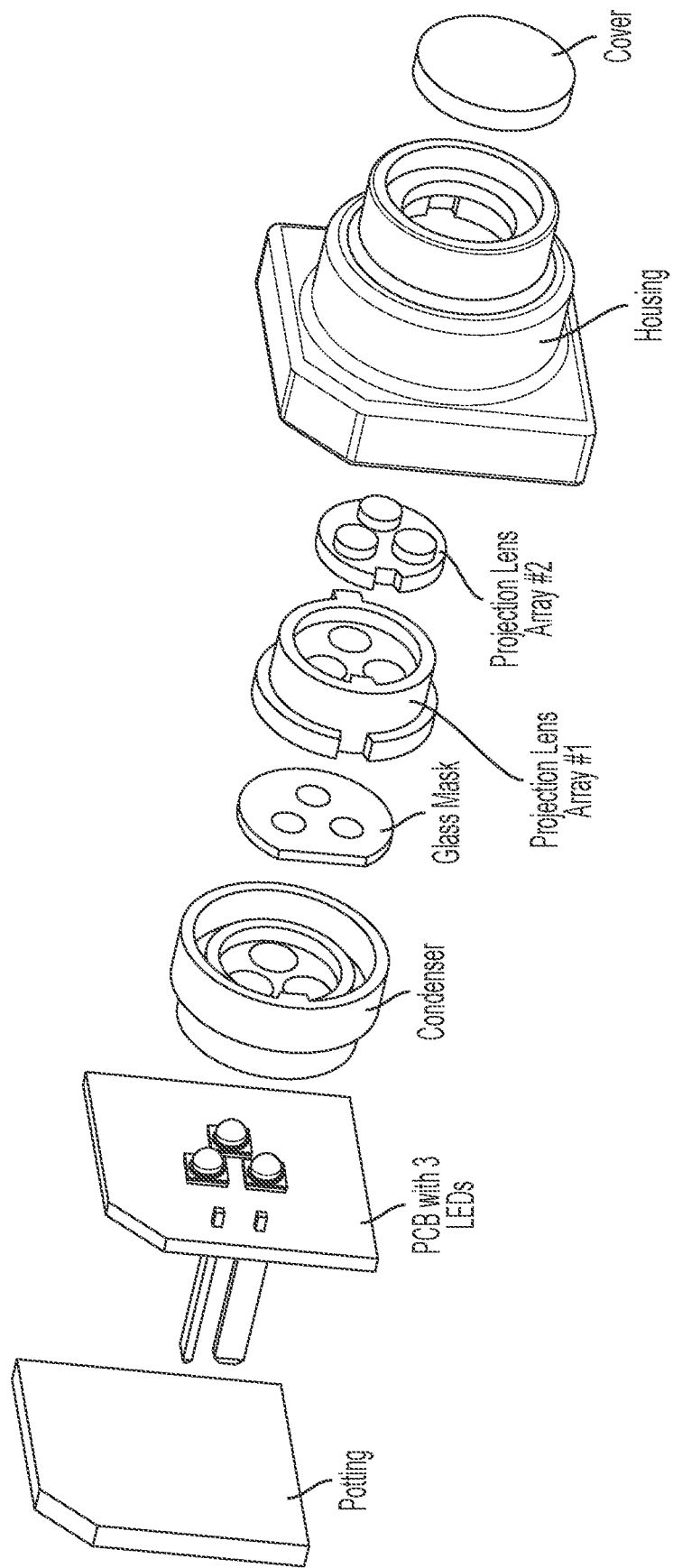
FIG. 14 is an exploded perspective view of the multi-color projection light module of FIG. 11.
Figure 15A:
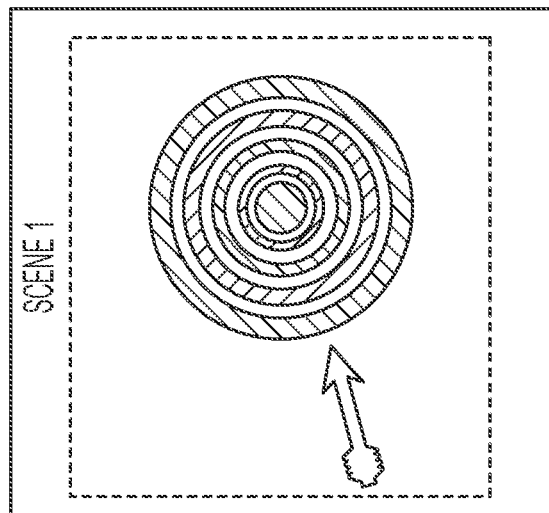
FIGS. 15A-C are images showing an animation projected by the projection light module.
Figure 15B:
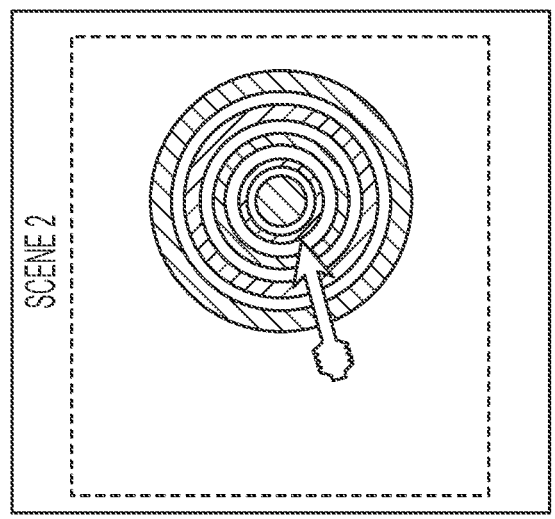
Figure 15C:
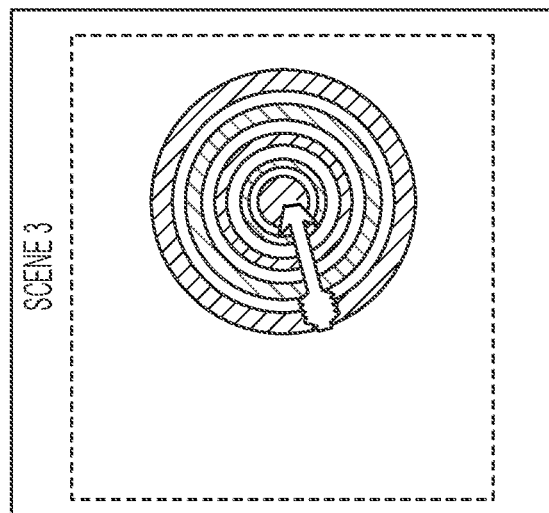

As shown in FIGS. 6-14, the illumination module may include a housing with an outer cover. The projection lens arrays and glass mask may be disposed at a condenser, with the PCB and LEDs disposed behind the condenser and operable to emit light through the condenser and mask and lens arrays so that the module projects a multi-colored icon or logo. As best shown in FIGS. 9, 13 and 14, the housing receives the PCB (with three different colored LEDs) and condenser, with the glass masks (or a single glass mask or element or substrate with three different masking portions or elements established thereat and aligned with the respective LEDs) disposed at the condenser. A first projection lens array and a second projection lens array are disposed at the condenser and also received in the housing, and a cover element is disposed at the housing. The cover element may be sealed at the housing and a potting material or sealant material is disposed at the rear of the housing to seal the PCB and other components within the housing after the components are received in the housing. When the potting material is disposed at the rear of the housing, the electrical connector terminals of the PCB protrude through the potting material for electrically connecting the light module to a wire or wire harness of the exterior mirror assembly (if the light module is disposed at or incorporated in the exterior mirror assembly) or of the vehicle.

As shown in FIG. 2, light emitted by each LED (when respectively electrically powered) passes through the condenser and through the respective mask (or portion of a masking element) and through the projection lens array(s), which function to project or guide the respective single-colored first, second and third images (each having it respective color that is different from the colors of the other images) toward and at/onto a surface or ground area, where the single-colored first, second and third images overlap or overlay one another to establish the multi-colored projected image at the ground area. For example, the projection lenses may project the light such that the single-colored images overlap or overlay one another at a center region of an area below the light module, or the projection lenses may be configured to project the single-colored images in any direction so that the single-colored images overlap or overlay one another at a desired or targeted surface or ground region or area.

Taking, for illustration purposes, a multi-colored logo for the General Motors nameplate Cadillac (see FIGS. 2 and 3), a plurality of LEDs is used, comprising a first LED emitting red light, a second LED emitting green light, and a third LED emitting blue light. Each LED is paired with a respective glass mask that is created from the respective red, green and blue channels or portions of the colored logo. Each glass mask provides patterns of varying levels of transmission of light so that the appropriate amount of the particular light color passes through the mask and is projected onto the ground, such that, when each LED is electrically powered to emit the colored light that passes through the respective mask, the three colored portions of the logo or first, second and third logos overlap at the ground area and combine to form or establish the multi-colored logo. As shown in FIG. 2, the "red" mask (the upper mask in FIG. 2) is substantially light transmissive at some regions, particularly at the regions of the Cadillac logo that are red (the four larger rectangles), and less light transmissive at other regions, such that the red light emitted by the associated red LED passes through the mask to establish a red portion of the logo or a red logo at the ground area. Likewise, the "green" mask (the middle mask of FIG. 2) is substantially light transmissive at some regions and less light transmissive at other regions, such that the green light emitted by the associated green LED passes through the mask to establish a green portion of the logo or a green logo at the ground area. Similarly, the "blue" mask (the lower mask of FIG. 2) is substantially light transmissive at some regions and less light transmissive at other regions, such that the blue light emitted by the associated blue LED passes through the mask to establish a blue portion of the logo or a blue logo at the ground area. When all three of the red, green and blue logos are overlapped and combined at the ground area, the multi-colored Cadillac logo (having red, gold, silver, white and black portions) is established at and viewable at the ground area.

The masks comprise glass masks that have different portions or versions of the logo or indicia or icon with the glass etched or masked to provide a gradient transmission of light, such that, when the associated colored LED emits light that passes through the associated mask, the single-colored version or portion of the logo is projected at the ground area. The two or three different single-colored versions or portions of the logo are projected at the ground area and overlap and combine to form the multi-colored logo for viewing at the ground area. Each mask may have generally the same pattern (e.g., the shape and outlines of the Cadillac logo) established or etched thereat, with different degrees of transmissivity, such that, when the appropriate colored light passes through each respective mask, the projected images or patterns overlap at the ground area to establish the multi-colored pattern or logo. Optionally, each LED may emit light at the same or different intensities, and/or each mask may attenuate more or less light, to cooperatively establish the desired coloring and intensity of the multi-colored logo or indicia established at the ground area.

Thus, the module utilizes three LEDs (e.g., red, green, blue) and three unique masks that, when aligned and overlaid, create a multi-color/full color projected image. If using the same mask for all three LEDs, each color LED may be proportionally adjusted in brightness to create single color logos (such as in a manner similar to the 'My Color™' system commercially available in Ford vehicles). If using white LEDs for all three LEDs, this could triple the brightness from a conventional single LED lamp if using a common mask. Optionally, the module may utilize more than three LEDs and associated masks or less than three LEDs and associated masks, depending on the particular application and color of the logo or indicia that is to be projected. For example, if the projected colored logo is only two colors (such as, for example, red and green or blue and white), then only two masks and LEDs would be required to project that colored logo. Optionally, the light module may utilize white light-emitting LEDs and use color filters to change the color of the light emitted by the LEDs. The color filters may be disposed anywhere in the lens stack and may comprise plastic colored films, colored glass and/or the like.

Thus, the illumination module is configured for mounting at a side of a vehicle and is operable to project a logo or indicia at a ground area adjacent the vehicle. The illumination module comprises a plurality of light emitting diodes (LEDs) comprising a first LED and a second LED, and comprising a first mask and a second mask, with the first mask associated with the first LED, and the second mask associated with the second LED. When the first LED is electrically powered, light emitted by the first LED that passes through the first mask is a first color and, when the second LED is electrically powered, light emitted by the second LED that passes through the second mask is a second color, with the first color being different from the second color. When the first LED is electrically powered to emit light and with the illumination module disposed at the side of the vehicle, light emitted by the first LED passes through the first mask to create a first projected image at a ground area adjacent the equipped vehicle at the side of the vehicle at which the illumination module is disposed, with the first projected image comprising a first portion or version of a logo or indicia having the first color. When the second LED is electrically powered to emit light and with the illumination module disposed at the side of the equipped vehicle, light emitted by the second LED passes through the second mask to create a second projected image at the ground area adjacent the equipped vehicle at the side of the vehicle at which the illumination module is disposed, with the second projected image comprising a second portion of the logo or indicia having the second color. With the first portion of the logo having the first color and the second portion of the logo having the second color, the first projected image and the second projected image overlap at the ground area adjacent the equipped vehicle and combine to establish the projected logo or indicia at the ground area adjacent the equipped vehicle.

Optionally, the illumination module is operable to project a multi-colored logo or indicia at a ground area adjacent the vehicle, with the illumination module comprising a plurality of light emitting diodes (LEDs) comprising a first LED, a second LED and a third LED, and a first mask associated with the first LED, a second mask associated with the second LED, and a third mask associated with the third LED. When the first LED is electrically powered, light emitted by the first LED that passes through the first mask is a first color, and when the second LED is electrically powered, light emitted by the second LED that passes through the second mask is a second color, and when the third LED is electrically powered, light emitted by the third LED that passes through the third mask is a third color, with the first color being different from the second and third colors, and the second color being different from the first and third colors, and the third color being different from the first and second colors. When the first LED is electrically powered to emit light and with the illumination module disposed at the side of the equipped vehicle, light emitted by the first LED passes through the first mask to project a first projected image at a ground area adjacent the equipped vehicle, with the first projected image comprising a first logo or indicia having the first color. When the second LED is electrically powered to emit light and with the illumination module disposed at the side of the equipped vehicle, light emitted by the second LED passes through the second mask to project a second projected image at the ground area adjacent the equipped vehicle, with the second projected image comprising a second logo or indicia having the second color. When the third LED is electrically powered to emit light and with the illumination module disposed at the side of the equipped vehicle, light emitted by the third LED passes through the third mask to project a third projected image at the ground area adjacent the equipped vehicle, with the third projected image comprising a third logo or indicia having the third color. The first projected image, the second projected image and the third projected image overlap at the ground area adjacent the equipped vehicle and, combined, establish the multi-colored logo or indicia at the ground area adjacent the equipped vehicle.

The masks may have respective patterns associated with the respective portion or version of the logo or indicia. For example, the first mask may have a first pattern associated with the first logo or indicia established thereat, and the second mask may have a second pattern associated with the second logo or indicia established thereat, and the third mask may have a third pattern associated with the third logo or indicia established thereat. Optionally, the first mask comprises a first glass mask that is etched and/or masked so that the first pattern comprises a first varying light transmissive pattern, such that, when light emitted by the first LED passes through the first glass mask, the first logo or indicia is projected at the ground area. Likewise, the second mask may comprise a second glass mask that is etched and/or masked so that the second pattern comprises a second varying light transmissive pattern, such that, when light emitted by the second LED passes through the second glass mask, the second logo or indicia is projected at the ground area. Also, the third mask may comprise a third glass mask that is etched and/or masked so that the third pattern comprises a third varying light transmissive pattern, such that, when light emitted by the third LED passes through the third glass mask, the third logo or indicia is projected at the ground area. Each of the first, second and third logos or indicia comprises a respective single color portion or version of the logo or indicia, whereby, when they are overlapped and combined at the ground area, they form or establish the multi-colored logo or indicia.

Optionally, the module may use unique masks that animate to draw attention to, or point the driver toward the vehicle, such as by proportionally controlling each LED in sequence (for example, a segmented arrow that fills with each LED or foot prints walking toward the car or just a simple animation like a size of a logo growing or shrinking by switching from one LED/Mask to another and to another). The animation may utilize any number of masks and associated LEDs to provide the desired apparent movement at the projection.

The animation light module may utilize different light colors or may utilize single or commonly colored LEDs, such as two or three or more white light-emitting LEDs, depending on the particular application of the light module and desired animation and projected images. Optionally, the LEDs may emit different-colored light (or the module may include color filters) to provide a multi-colored projected image, and, when operating in the animation mode, the different colored images may provide the animation, or the module may emit different commonly colored images (such as via white light emitted by the LEDs aligned with the respective masks). The LEDs may be operable to emit different colors themselves (for example, an LED may emit red light (or other color) when all the LEDs are energized to project the multi-color image, and that LED may emit white light when the LEDs are sequentially energized to provide a projected animation at the ground area. The light module may switch between a multi-colored image projection and an animation projection responsive to a user input or responsive to detection of a person at the side of the vehicle or the like.

Figure 16C:
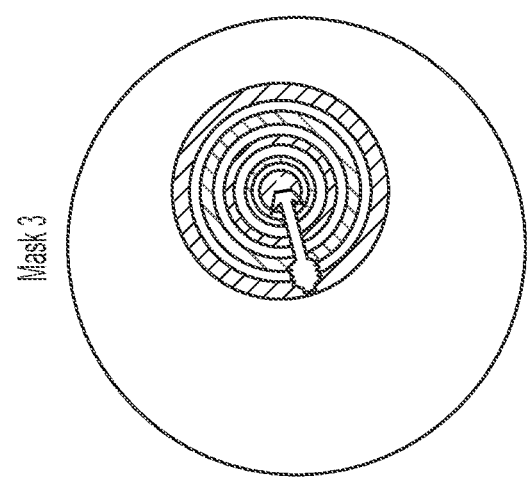
FIGS. 16A-C are images of three masks used to project the images shown in FIGS. 15A-C.
Figure 16B:
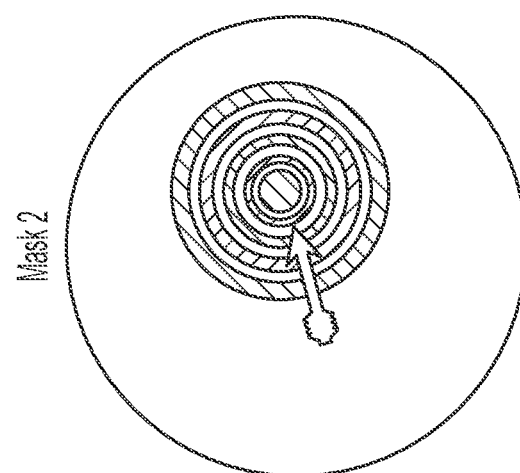
Figure 16A:
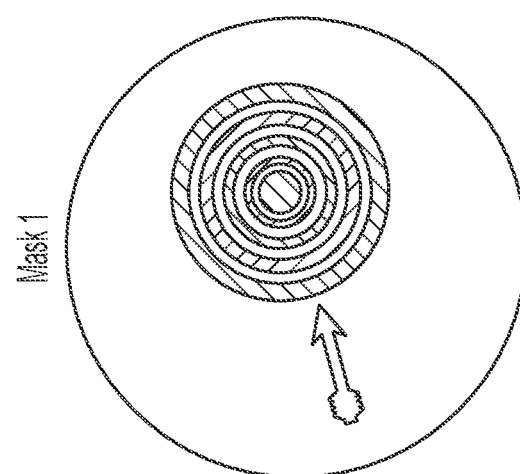

As shown in FIGS. 15A-C and 16A-C, the light module may adjust or control the light emitted by each LED to project a moving icon or element at the projection region. As shown in FIGS. 16A-C, the common areas or portions of the projected image or scene (such as the target in FIGS. 16A-C) are duplicated on each mask, which may provide a reduced number of parts and reduced total contrast. The projection shown at FIGS. 15A and 16A may be achieved with one LED on (to show the first position of the projected arrow or element or portion of the indicia), while the projection shown at FIGS. 15B and 16B may be achieved with a second LED on (to show the second position of the projected arrow or element or portion of the indicia), and the projection shown at FIGS. 15C and 16C may be achieved with a third LED on (to show the third position of the projected arrow or element or portion of the indicia), and with the transitions between the first and second projections achieved via PWM control of the first and second LEDs, and with the transitions between the second and third projections achieved via PWM control of the second and third LEDs.

Optionally, and such as shown in FIGS. 17A-D, four masking elements and four LEDs may be used to provide the desired animation, which requires additional parts (four masks and four LEDs) and an increased total contrast. For example, the common areas or portions of the scene or projection or projected image is put or established at a common mask (FIG. 17A), and three separate masks (FIGS. 17B-D) may be provided to achieve the desired animation. Thus, the first projected image (FIG. 17B) may be achieved with the first and second LEDs on (to show the common areas and the first position of the projected arrow or element or portion of the indicia), while the projection shown at FIG. 17C may be achieved with the first and third LED on (to show the common areas and the second position of the projected arrow or element or portion of the indicia), and the projection shown at FIG. 17D may be achieved with the first and fourth LED on (to show the common areas and the third position of the projected arrow or element or portion of the indicia). The transition between the first projection (FIG. 17B) and the second projection (FIG. 17C) is achieved via the first LED remaining on and PWM control of the second and third LEDs, and the transition between the second projection and the third projection (FIG. 17D) is achieved via the first LED remaining on and PWM control of the third and fourth LEDs.

Figure 18:
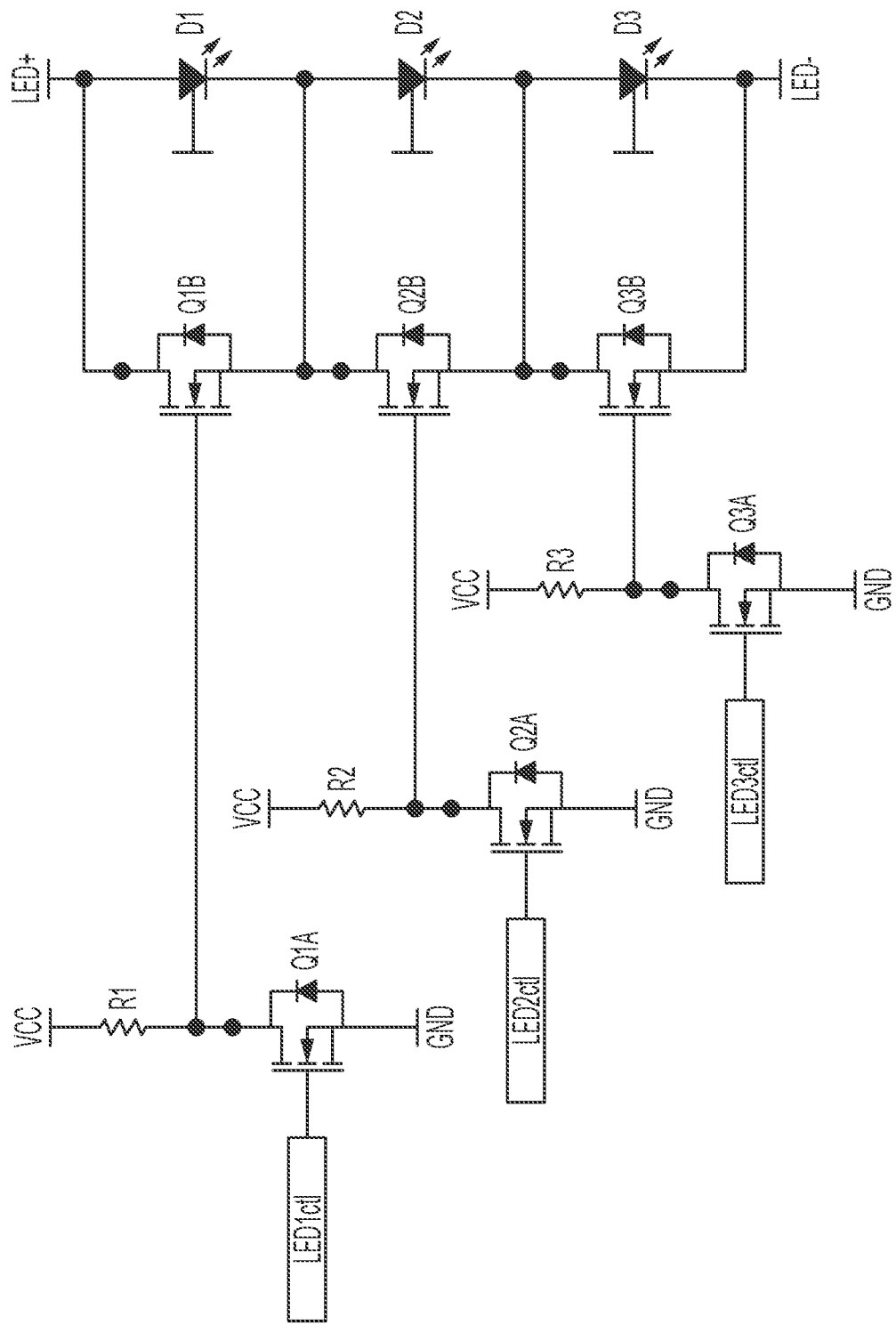
FIG. 18 is an electrical schematic of the projection light module.

When proportionally controlling multiple LEDs at once, the on/off cycles of each LED may be synchronized so that only one LED is on at a given time period. For example, and such as shown in FIG. 18, the light module includes circuitry that powers a single LED at a given time. By limiting the design to a single LED active at a given instant (and optionally fading between activation of the LEDs), the control circuitry and supply are greatly simplified. By placing the LEDs in series, the driver circuitry is limited to a single constant current driver. Limiting to one active LED at a given time period allows a buck topology switching regulator rather than a more complex inverting buck/boost or single-ended primary-inductor converter (SEPIC) (which is a type of DC/DC converter allowing the voltage at its output to be greater than, less than, or equal to that at its input). Referencing the drain of the Field Effect Transistor (FET) with a pull-up resistor only gives about 3 to 3.3 v (LED forward voltage) of gate-source voltage, which may not be enough to fully enhance an N-channel metal-oxide-semiconductor field-effect transistor (MOSFET). Typically, a higher voltage is generated though the means of a charge pump. With only one LED active, the source voltage for that FET remains at around 0.2 v (for any LED in the string), allowing the around 5 v supply to fully control the FETs.

Optionally, and in accordance with another aspect of the present invention, the module may be operable to project or emit a large-scale (such as a 'premium') logo.

Figure 20:
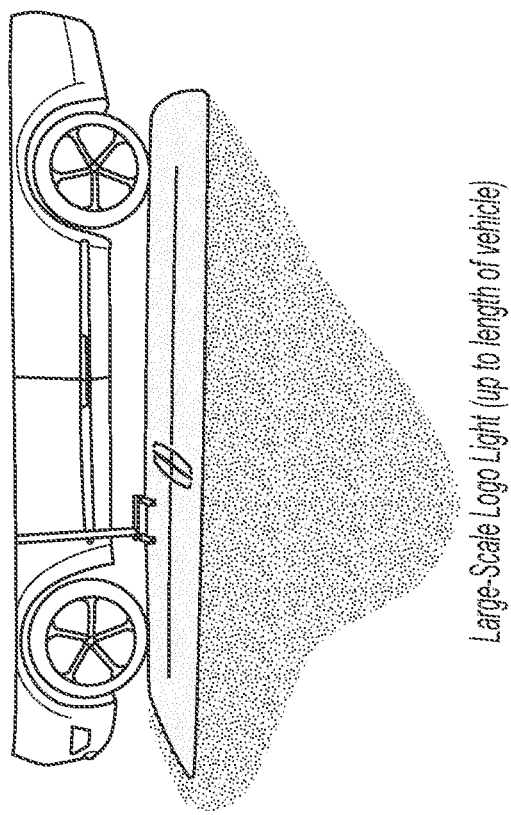
FIG. 20 is a perspective view of a large-scale logo light projecting onto a ground area at and along a side of a vehicle.
Figure 19:
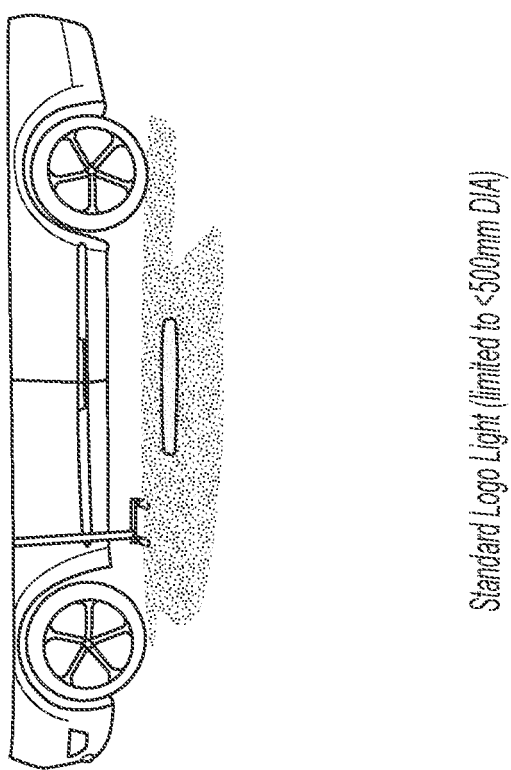
FIG. 19 is a perspective view of a logo light projecting onto a ground area at a side of a vehicle.

In such an application, the module utilizes a lens stack similar to wide-angle lens stacks in automotive surround-view/360 view cameras. The module may project a large 'welcome mat' or large text or shapes or emblems or multiple logos alongside the vehicle (compare large logo of FIG. 20 to small logo of FIG. 19). Light brightness (illuminance) may not be at bright as the standard logo as it is being spread over a much larger area. This could provide a ground illumination function if done like shown in the example of FIG. 20 (Lincoln welcome mat). The lens stack may be able to be simplified from a camera lens stack in order to reduce complexity and cost.

Optionally, an illumination module of the present invention may provide a ground illumination feature and a logo projection feature, wherein the features are provided by separate individual LEDs. For example, the illumination module may utilize one LED for the logo, and one LED for the ground illumination (GI) or maneuvering light (used for slow speed driving and for camera vision). The module may be operable to activate or turn the two LEDs at the same time or independently. The Independent functions can be controlled by a 3-wire connection (shared ground, one wire for the logo light, and one wire for the GI light) or a 2-wire connection where a microcontroller controls the timing to 'switch' from one light to the other light upon power-up.

Figure 26:
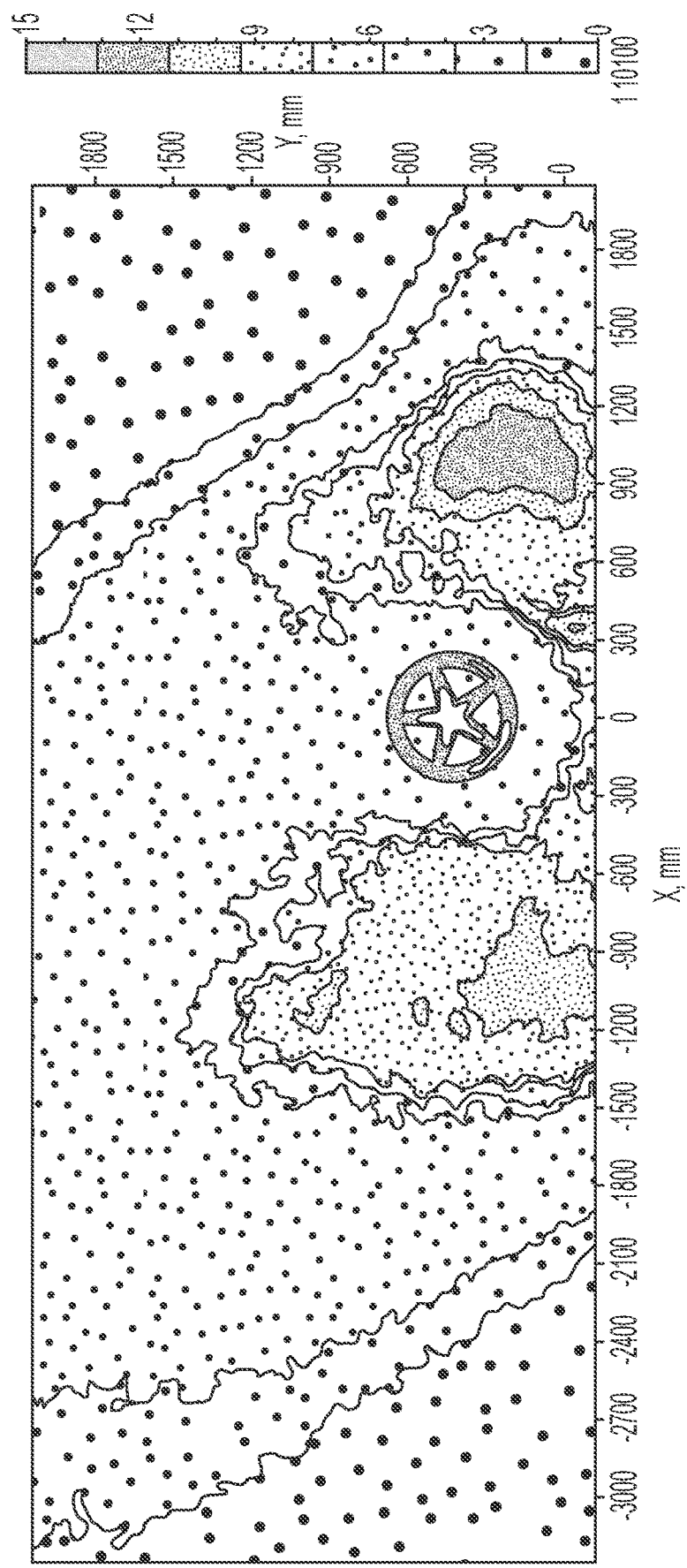
FIGS. 26-28 are views showing light projected by an illumination module of the present invention, showing the ground illumination having a reduced illumination region that corresponds to a location of a projected icon or logo.
Figure 27:
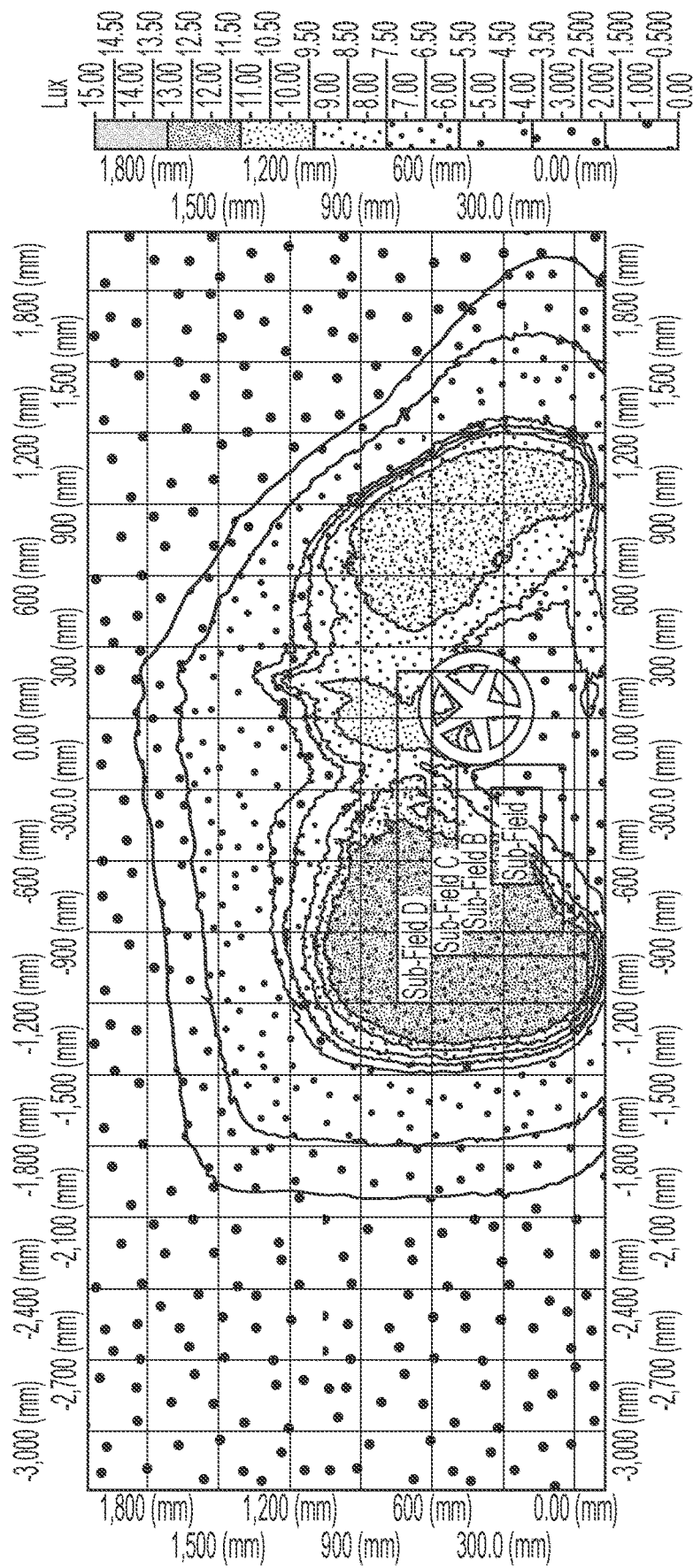
Figure 28:
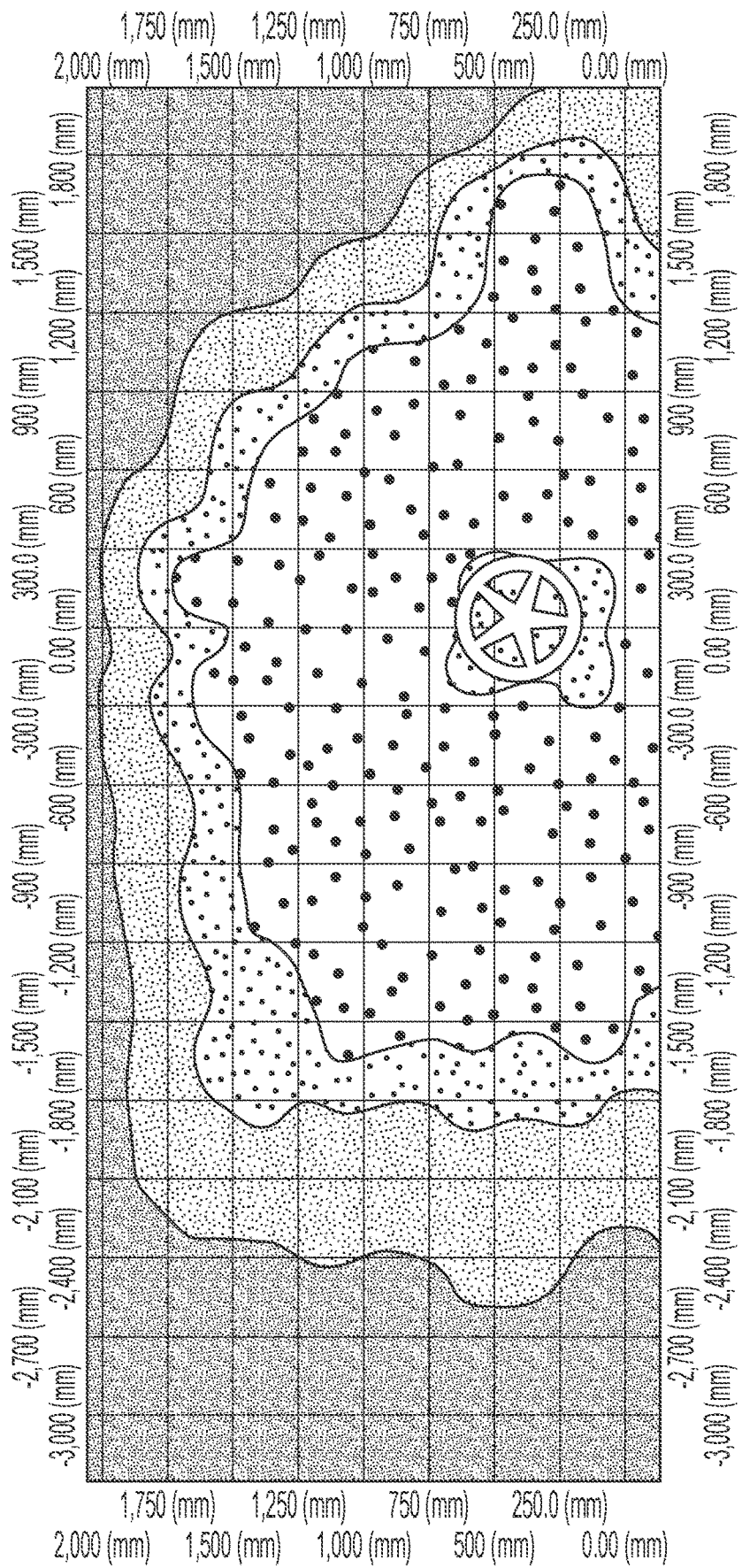

In order to reduce washout of the logo light projection when the GI light is also activated, the lens at or in front of the GI light is formed or configured to provide a desired pattern of illumination that provides or creates a 'dead zone' where the ground illumination is significantly reduced at the area where the logo is projected in order to increase the effective contrast seen by a person viewing the projected logo at the ground at or near the vehicle. An example of this can be seen with reference to FIGS. 26-28, where the ground illumination pattern has a dim spot or area with reduced illumination, with the logo being projected at that area so that the ground around the logo is well illuminated and the logo has enhanced contrast and stands out at the area of reduced ground illumination (illumination provided by the GI LED).

Figure 24:
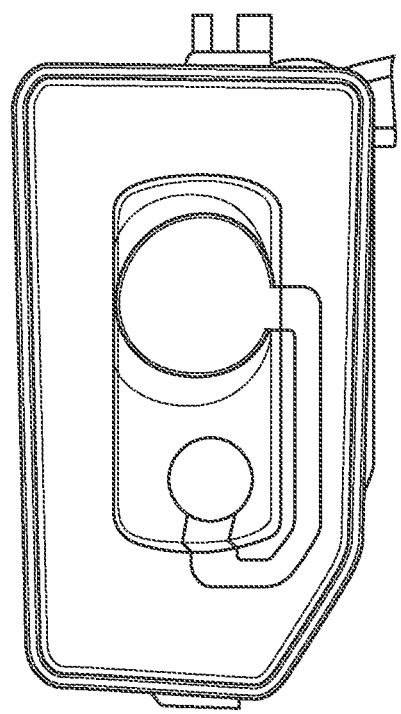
FIGS. 23 and 24 are views of the illumination module of FIG. 21.
Figure 25:
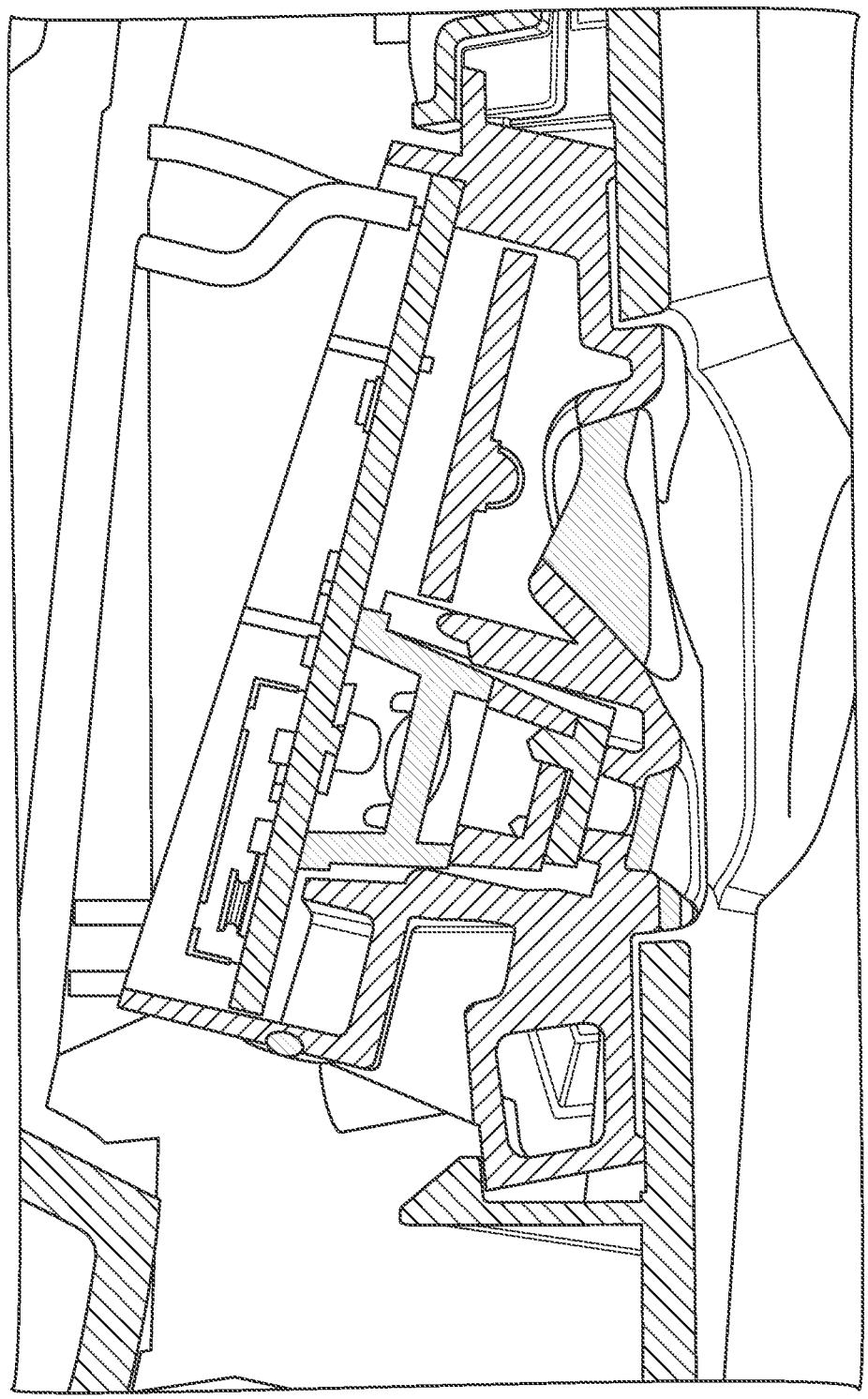
FIG. 25 is another sectional view of the illumination module of FIG. 22.

The light module uses a single LED to project a logo and also some ground illumination light that surrounds the logo. The module uses 2-LEDs in order to improve the GI performance (with the illuminance target size being much larger on the ground along the longitudinal axis of the vehicle). Optionally, the light module may use a single printed circuit board or PCB (see FIGS. 21 and 23) or two PCBs (see FIGS. 22 and 25). Using two PCBs allows the GI LED to be lowered or moved closer to the optical lens, which is more efficient and provides a larger area of illumination. Optionally, a welded cover (shown in FIG. 22) may be used, or a 2-shot design (shown in FIGS. 23 and 24) may be used for the light-transmitting cover (with the 2-shot lens molded into the opaque (black) housing, shown with the single-PCB design concept). The 2-LED construction also allows for independent control of the two functions, which is dependent on the use case and customer preference. For example, if a customer wants the logo to have better contrast, the module may have the ability to initially show only the logo (in other words, have the logo LED activated first for at least an initial period of time) and then have the car control module or other circuitry switch to the ground illumination function (where the logo may still be activated or may be deactivated).

In the case where both LEDs would come on or be operable at the same time, the GI light may overlap the logo, which may reduce the contrast and perceived 'sharpness' of the logo. In order to improve this, the GI cover is a tailored freeform optical lens for the ground illumination that selectively reduces the illuminance in the area of the logo image. This also helps improve the contrast/sharpness of the logo.

The illumination module thus provides a lens projection light that projects an image of an icon or logo or indicia of the lens onto the ground at or near the side of the vehicle. By using an optical lens with one or two freeform surfaces and a light source or light emitting diode (LED) for each of the logo function and the ground illumination function, the luminance distribution at a surface can be controlled to produce a logo or image or text on that surface, with ground illumination around the projected logo but not washing out or reducing the visibility/contrast of the logo. This system can be used to create a lighted image, logo, text, shape and/or the like very similar to multi lens projection lights (such as those described in U.S. Pat. No. 8,801,245, which is hereby incorporated herein by reference in its entirety).

The system of the present invention may utilize tailored or customized optics to provide the desired projected image and/or ground illumination pattern. The system uses a Mathematical Solution, which uses a series of differential equations to solve for a three dimensional (3D) surface, and which uses user inputs sources, targets, luminance, and basic lens parameters, whereby the program solves for the light entrance and light exit surfaces (such as, for example, an ffTOP mathematical solution or the like (such as described at www.fftop.eu), which can be used for the making of a free-form optic that provides an arbitrary distribution of light at a target or surface). In accordance with the present invention, such a free-formed optic provides enhanced homogeneity of light distribution or may have a patterned distribution, such as for a logo or icon or indicia.

The system or algorithm for developing the lens of the illumination module of the present invention finds a 3D design for the 3D application and Models the source as a point source. The system solves rather than optimizes and outputs a solid 3D lens. The system is operable to provide irregular targets and specific distributions. The mathematical system of equations or algorithm provides illumination design software for calculating optical freeform surfaces and solves the task to tailor or redistribute a given light source intensity distribution into nearly arbitrary irradiance distribution on a target surface. The algorithm provides a substantially exact solution of a differential equation system similar to finite element methods. Such a mathematical model or solution or algorithm is used to form a three dimensional single formed optic (having the selected or desired three dimensional surface or surfaces for providing the desired projected icon and/or illumination pattern) of a vehicular illumination module in accordance with the present invention.

Optionally, the system of the present invention may utilize tailored or customized optics to provide tailored freeform reflectors for illumination devices. For example, ground illuminators, forward spot lights and/or rearward spot lights may be constructed and optimized using a freeform reflector or freeform lens and reflector combination in accordance with the present invention.

Figure 22:
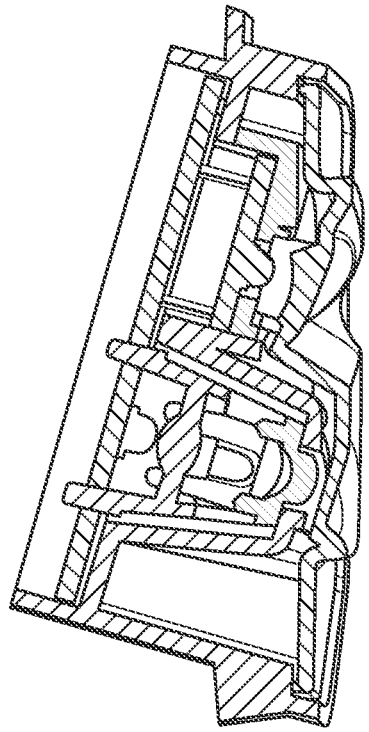
FIG. 22 is a sectional view of an illumination module of the present invention with two LEDs disposed on two printed circuit boards.
Figure 21:
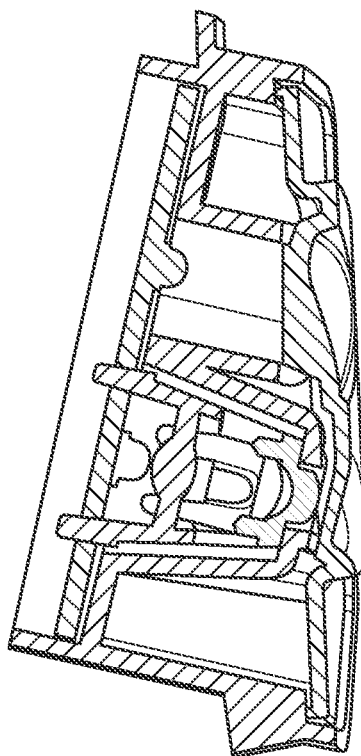
FIG. 21 is a sectional view of an illumination module of the present invention with two LEDs disposed on a common printed circuit board.
Figure 23:
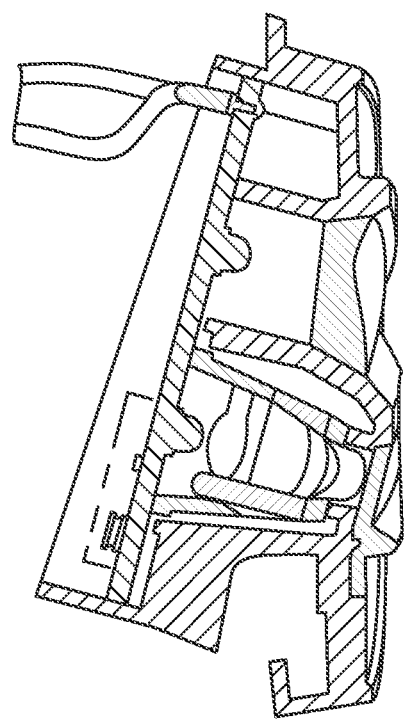

As shown in FIGS. 21 and 22, the illumination module includes two light sources (such light emitting diodes or the like) established at a circuit board or element (or two separate circuit boards or elements) that is/are disposed at a rear portion of a housing. The outer portion or cover of the illumination module may include a free formed lens that is formed or designed via an algorithm to provide a ground illumination or generally uniform illumination of light emitted by the respective light source and a projected icon or indicia or logo or the like as emitted via actuation of the respective logo light source. The dual feature (ground illumination and icon projection) is provided via a single lens or optic without masking or other separate elements due to the particular form or shape of the lens.

Optionally, the circuit element is supported at housing so that the circuit element is angled relative to the outer cover of the module. The angle of the circuit element may be selected depending on the particular application of the illumination module, and may result in light emanating from one or more illumination sources being directed generally downward and partially away from the side of the vehicle at which the illumination module is disposed. Thus, when the illumination module is mounted at a side of a vehicle, light emanating from the light emitting diode (when the light emitting diode is powered) may be directed generally downward and rearward and/or away from the vehicle to illuminate the ground area adjacent the side of the vehicle.

The lens includes an icon or indicia or logo or the like so that, when the light emitting diode is powered, light emanating from the light emitting diode backlights an icon (or indicia or logo or the like) established at the lens so that an image of the icon is viewable at the illumination module and/or is projected by the illumination module and onto the ground area adjacent the vehicle (or elsewhere at or near the side of the vehicle depending on the lens assembly and angle of the circuit element and lens assembly). The lens may be disposed at the end of the housing of the module, or may be overmolded onto the LED or light source (in such an application, the module would include only one tailored freeform lens), while remaining within the spirit and scope of the present invention.

The cover of the illumination module may be at least partially or substantially translucent or transparent at least at the illumination sources such that illumination emitted via the illumination sources is transmitted through the cover at the illumination regions and toward the vehicle side or door or ground area. The illumination regions may have a lens or aperture thereat to direct the light in the desired direction and in the desired manner. Optionally, the illumination regions of the cover may provide a diffusing optic or diffusing effect or frosting to diffuse or spread out the emitted light to provide substantially uniform illumination and to limit or substantially preclude bright spots at the vehicle side or door when the illumination source is activated.

The illumination module comprises a unitary module that may be plugged in or installed or attached at an opening at a vehicle (such as an opening at a door handle or exterior rearview mirror or trim element or the like) and may comprise a substantially water impervious sealed module (optionally, with the outer cover comprising a unitary construction and including the lens and an outer portion for sealing at and around the housing. An electrical lead (such as a pair of wires or the like) is electrically connected to circuitry at the circuit element or board and may include one or more terminals extending through and from a rear portion or wall or potting of the casing or housing for electrically connecting the illumination module to a power source and/or control of the vehicle and/or door and/or exterior rearview mirror assembly and/or the like.

Therefore, the illumination module provides a dual function and is operable to provide a light projection function (such as projection of white or non-white light, such as a selected color or such as a variable color or the like to optionally coordinate with an interior color scheme of the vehicle or the like) with one (or more) light emitting diode (or other suitable light source) and a ground illumination function (such as via one or more white light-emitting light emitting diodes or other suitable light source). The illumination module comprises a self-contained unitary sealed module with two light emitting diodes and the lens/light guiding element to provide the desired illumination effect with the illumination source or illumination sources.

The illumination module thus may comprise a small, self-contained module that includes a housing that substantially encases the illumination source and circuitry of the illumination module. The housing and/or cover attached thereto includes an outer wall that substantially corresponds to the contours of the mirror assembly or door handle assembly at the illumination module such that the outer vehicle surface has a substantially continuous outer surface or wall at the illumination module. The module and housing may be substantially sealed so as to be substantially impervious to water, dirt, debris and the like, so that the module is well suited for the exterior application at the vehicle exterior rearview mirror or vehicle door handle.

Thus, the light module provides the function of ground illumination and projection light by the use of one or two light emitting diode and one or two freeform lenses (which may be molded or otherwise formed to the desired specifications or parameters). Typically, projection lights provide a very narrow beam of light. When projected on the ground, the "illumination circle" may be about 300-500 mm. The light module of the present invention provides such illumination capability and also provides ground illumination of at least approximately 2 lux, and preferably at least approximately 4 lux, over about a 600 mm by 1200 mm generally rectangular-shaped (or other shape) ground illumination area or zone, while providing a focused projection of the icon or logo or indicia or image within the ground illumination zone. Thus, the present invention provides both a projection light and a ground illumination light via a single module.

The illumination module thus may provide ground illumination via a lens or reflector or optic that is tailored to produce a very specific illumination pattern. For example, the illumination pattern may be uniform, or may include or provide a hot spot and gradient, or it may project or represent a logo or icon or indicia or the like. The tailoring or customizing of the lens or optic may be done by mathematical integration or by ray tracing in a 3D environment.

The illumination source may comprise any suitable illumination source, such as one or more light emitting diodes (LEDs), such as white light-emitting LEDs or high intensity power LEDs (such as the types described in U.S. Pat. Nos. 7,195,381 and/or 6,690,268, which are hereby incorporated herein by reference in their entireties) or organic light emitting diodes (OLEDs) or electroluminescent light sources or the like. The illumination source may comprise a substantially white light-emitting illumination source, or may comprise a colored light-emitting illumination source (or a white light-emitting illumination source may emit light that passes through a color filter or the like) to provide color illumination (such as blue or other color as desired) at the vehicle side area depending on the particular application of the illumination module. For example, the illumination module may emit or transmit colored light that may match or correspond to the interior and/or exterior lighting of the particular vehicle to which the illumination module is mounted.

The illumination module may provide a cover and icon film or template that provides a display of a vehicle logo or the like (or any other vehicle logo or brand name or custom display icon or indicia or the like). Thus, the illumination modules may provide a back lit icon or indicia or logo or emblem to provide enhanced ground illumination at the side of a vehicle. The icon or indicia or logo or emblem may comprise the vehicle manufacturer logo or the like, or may comprise a selected icon or indicia or logo, such as may be selected by the owner of the vehicle. For example, the owner of the vehicle may select a module having a desired icon or indicia or logo element or optical properties and the selected illumination module may be installed in the vehicle door handle and/or mirror assembly (or elsewhere on the vehicle, such as at or on or in the vehicle door or at or on or in a side panel of the vehicle or the like) to provide the customized or personalized ground illumination function. Such a selection and installation of the illumination module may be performed during manufacturing of the vehicle or as an aftermarket change to the vehicle. The icon illumination module thus may provide a personalized or customized illumination at the side of the vehicle, such as by utilizing aspects of the systems and assemblies described in U.S. Pat. Nos. 7,626,749; 7,255,451 and/or 7,289,037, which are hereby incorporated herein by reference in their entireties. Optionally, the illumination module may be disposed at an exterior rearview mirror assembly of the vehicle (such as at the housing of the mirror assembly or in the housing and behind the reflective element so as to be viewable through the reflective element) or the like, or may be disposed elsewhere at the exterior of the vehicle, such as at a door handle of the vehicle or the like. Optionally, an illumination module with a backlit icon of the types described above may be disposed at an interior portion of a vehicle, such as at an interior rearview mirror assembly (such as at a mirror casing or behind a reflective element and viewable through the reflective element or the like) of the vehicle or such as at or proximate to the interior door lock button or switch or the like. The illumination module thus may provide a security indicator function at the interior rearview mirror assembly or elsewhere in the interior cabin of the vehicle.

Optionally, and desirably, the cover and/or housing may be overmolded over the illumination source or sources and circuitry to provide a substantially sealed and substantially water impervious illumination module. For example, the housing may be overmolded over and around a metal stamping or stamped circuit element or plate with the illumination source or sources (such as LEDs or the like) fastened thereto or otherwise established thereon, or the housing may be overmolded over and around a printed circuit board or element with the illumination sources established thereon.

Thus, the present invention provides an illumination module at an exterior portion of the vehicle. Optionally, the illumination device or module of the present invention may be operable as an indicator to provide the driver with feedback as the driver or user or operator uses his or her key fob or as the passive or keyless entry system (PKE system) of the vehicle operates. Optionally, the illumination device or module may display vehicle logos or the like, and may use variable color LEDs that could be linked to an interior lighting system of the vehicle, such as to a MYCOLOR™ interior lighting system of the vehicle or the like.

Although shown and described as being disposed at an exterior rearview mirror assembly and/or door handle and/or exterior portion of a vehicle for providing illumination at a side of a vehicle, it is envisioned that the light module of the present invention is suitable for other applications. For example, a light module of the present invention may be disposed at an interior portion of a vehicle, such as at an interior rearview mirror assembly (such as at a mirror casing or behind a reflective element and viewable through the reflective element or the like) of the vehicle or the like, whereby actuation of the light module may provide broad illumination of the dashboard and/or instrument panel of the vehicle (generally beneath the mirror assembly), and may project a beam of light to illuminate (such as at a greater intensity of light as compared to the broad illumination) a targeted portion of the interior of the vehicle (such as for map reading or the like). Also, for example, a light module of the present invention may be suitable for use in non-automotive lighting applications, such as residential lighting or commercial lighting or the like. For example, a light module of the present invention may be converted to replace a household or residential or commercial business or office building light bulb, whereby the light module may provide normal lighting (that broadly illuminates the area surrounding the light module) in addition to projection lighting, such as in a similar manner as described above.

Optionally, the illumination module and/or an exterior rearview mirror assembly of the vehicle may incorporate a blind spot indicator device or element and/or a turn signal indicator device or element, such as by utilizing aspects of the devices described in U.S. Pat. Nos. 8,786,704; 8,058,977; 7,944,371; 7,492,281; 6,198,409; 5,929,786 and/or 5,786,772, which are hereby incorporated herein by reference in their entireties. The signal indicator or indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602 and/or 6,276,821, and/or International Publication No. WO 2006/124682, which are hereby incorporated herein by reference in their entireties. Optionally, the exterior rearview mirror assembly may include a wide angle reflector at or integral with the reflective element, such as by utilizing aspects of the elements described in U.S. Pat. Nos. 8,786,704; 7,748,856; 7,255,451; 7,195,381; 6,717,712; 7,126,456; 6,315,419; 7,097,312 and/or 6,522,451, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular ground illumination module, the vehicular ground illumination module configured for mounting at a vehicle, the vehicular ground illumination module comprising:
    a plurality of light emitting diodes (LEDs) comprising a ground illumination LED, a first icon LED, a second icon LED and a third icon LED;
    a freeform optic associated with the ground illumination LED;
    a first icon mask associated with the first icon LED, a second icon mask associated with the second icon LED and a third icon mask associated with the third icon LED;
    wherein, with the vehicular ground illumination module mounted at a side of a vehicle equipped with the vehicular ground illumination module and when the ground illumination LED is electrically powered to emit light, light emitted by the ground illumination LED passes through the freeform optic to illuminate the ground adjacent and along the side of the equipped vehicle at which the vehicular ground illumination module is mounted;

wherein the freeform optic is formed so that, with the vehicular ground illumination module mounted at the side of the equipped vehicle, light emitted by the ground illumination LED that passes through the freeform optic illuminates a ground illumination region of the ground adjacent and along the side of the equipped vehicle at a ground illumination intensity and illuminates an icon region of the ground at an icon illumination intensity, and wherein the ground illumination intensity is greater than the icon illumination intensity;

wherein, with the vehicular ground illumination module mounted at the side of the equipped vehicle and when the first icon LED is electrically powered to emit light, light emitted by the first icon LED passes through the first icon mask to project a first projected image onto the icon region of the ground;

wherein, with the vehicular ground illumination module mounted at the side of the equipped vehicle and when the second icon LED is electrically powered to emit light, light emitted by the second icon LED passes through the second icon mask to project a second projected image onto the icon region of the ground;

wherein, with the vehicular ground illumination module mounted at the side of the equipped vehicle and when the third icon LED is electrically powered to emit light, light emitted by the third icon LED passes through the third icon mask to project a third projected image onto the icon region of the ground;

wherein the first, second and third icon LEDs are individually electrically powered so that the first, second and third projected images provide animated images projected onto the icon region of the ground; and wherein the ground illumination LED is electrically powered responsive to a first input and the first, second and third icon LEDs are individually electrically powered responsive to a second input.

2. The vehicular ground illumination module of claim 1, wherein the first icon mask comprises a first glass mask, and wherein the second icon mask comprises a second glass mask, and wherein the third icon mask comprises a third glass mask.

3. The vehicular ground illumination module of claim 1, wherein the first icon LED is not electrically powered when the second icon LED or the third icon LED is electrically powered, and wherein the second icon LED is not electrically powered when the first icon LED or the third icon LED is electrically powered.

4. The vehicular ground illumination module of claim 1, comprising a housing and a printed circuit board disposed in the housing, wherein the first, second and third icon LEDs are disposed at the printed circuit board, and wherein the first, second and third icon masks are disposed between the printed circuit board and at least one projection lens at the housing.

5. The vehicular ground illumination module of claim 4, comprising a condenser disposed between the printed circuit board and the first, second and third icon masks.

6. The vehicular ground illumination module of claim 5, wherein the at least one projection lens disposed between the icon masks and a cover element, wherein the at least one projection lens is configured to project light that passes through each of the first, second and third icon masks toward the icon region of the ground.

7. The vehicular ground illumination module of claim 6, wherein the at least one projection lens comprises the freeform optic associated with the ground illumination LED.

8. The vehicular ground illumination module of claim 7, wherein the ground illumination LED is disposed at the printed circuit board.

9. The vehicular ground illumination module of claim 7, wherein the ground illumination LED is disposed at a second printed circuit board disposed in the housing.

10. The vehicular ground illumination module of claim 9, wherein the ground illumination LED is closer to the at least one projection lens than the first, second and third icon LEDs.

11. The vehicular ground illumination module of claim 1, wherein, when the first icon LED is electrically powered, light emitted by the first icon LED that passes through the first icon mask is a first color, and wherein, when the second icon LED is electrically powered, light emitted by the second icon LED that passes through the second icon mask is a second color, and wherein, when the third icon LED is electrically powered, light emitted by the third icon LED that passes through the third icon mask is a third color, and wherein the first color is different from the second and third colors, and wherein the second color is different from the third color.

12. The vehicular ground illumination module of claim 1, wherein the ground illumination region comprises at least an area at least 600 mm out from the side of the equipped vehicle and at least 1200 mm along the side of the equipped vehicle.

13. The vehicular ground illumination module of claim 12, wherein, when the ground illumination LED is electrically powered to emit light and with the vehicular ground illumination module mounted at the side of the equipped vehicle, light emitted by the ground illumination LED passes through the freeform optic to illuminate the ground illumination region of the ground at an intensity of at least 4 lux, and light emitted by the ground illumination LED passes through the freeform optic to illuminate the icon region of the ground at an intensity of less than 4 lux.

14. The vehicular ground illumination module of claim 1, wherein the first input and the second input comprise separate inputs.

15. The vehicular ground illumination module of claim 1, wherein, responsive to the first and second inputs being generated together, the vehicular ground illumination module initially electrically individually powers the icon LEDs for an initial period of time prior to electrically powering the ground illumination LED.

16. The vehicular ground illumination module of claim 1, wherein the first and second inputs comprise user actuatable inputs.

17. The vehicular ground illumination module of claim 1, wherein the first and second inputs comprise inputs generated by a passive entry system of the equipped vehicle.

18. The vehicular ground illumination module of claim 1, wherein the first projected image is projected at the icon region at an intensity greater than the icon illumination intensity, and wherein the second projected image is projected at the icon region at an intensity greater than the icon illumination intensity, and wherein the third projected image is projected at the icon region at an intensity greater than the icon illumination intensity.

19. The vehicular ground illumination module of claim 1, wherein the illuminated icon region is at least partially surrounded by the illuminated ground illumination region of the ground adjacent and along the side of the equipped vehicle.

20. A vehicular ground illumination module, the vehicular ground illumination module configured for mounting at a vehicle, the vehicular ground illumination module comprising:
- a plurality of light emitting diodes (LEDs) comprising a ground illumination LED, a first icon LED, a second icon LED and a third icon LED;
- a freeform optic associated with the ground illumination LED;
- a first icon mask associated with the first icon LED, a second icon mask associated with the second icon LED and a third icon mask associated with the third icon LED;
- wherein, with the vehicular ground illumination module mounted at a side of a vehicle equipped with the vehicular ground illumination module and when the ground illumination LED is electrically powered to emit light, light emitted by the ground illumination LED passes through the freeform optic to illuminate the ground adjacent and along the side of the equipped vehicle at which the vehicular ground illumination module is mounted;
- wherein the freeform optic is formed so that, with the vehicular ground illumination module mounted at the side of the equipped vehicle, light emitted by the ground illumination LED that passes through the freeform optic illuminates a ground illumination region of the ground adjacent and along the side of the equipped vehicle at a ground illumination intensity and illuminates an icon region of the ground at an icon illumination intensity, and wherein the ground illumination intensity is greater than the icon illumination intensity;
- wherein, with the vehicular ground illumination module mounted at the side of the equipped vehicle and when the first icon LED is electrically powered to emit light, light emitted by the first icon LED passes through the first icon mask to project a first projected image onto the icon region of the ground;
- wherein, with the vehicular ground illumination module mounted at the side of the equipped vehicle and when the second icon LED is electrically powered to emit light, light emitted by the second icon LED passes through the second icon mask to project a second projected image onto the icon region of the ground;
- wherein, with the vehicular ground illumination module mounted at the side of the equipped vehicle and when the third icon LED is electrically powered to emit light, light emitted by the third icon LED passes through the third icon mask to project a third projected image onto the icon region of the ground;
- wherein the first projected image is projected at the icon region at an intensity greater than the icon illumination intensity, and wherein the second projected image is projected at the icon region at an intensity greater than the icon illumination intensity, and wherein the third projected image is projected at the icon region at an intensity greater than the icon illumination intensity;
- wherein the illuminated icon region is at least partially surrounded by the illuminated ground illumination region of the ground adjacent and along the side of the equipped vehicle;
- wherein the first, second and third icon LEDs are individually electrically powered so that the first, second and third projected images provide animated images projected onto the icon region of the ground; and
- wherein the ground illumination LED is electrically powered responsive to a first input and the first, second and third icon LEDs are individually electrically powered responsive to a second input.

21. The vehicular ground illumination module of claim 20, wherein the ground illumination region comprises at least an area at least 600 mm out from the side of the equipped vehicle and at least 1200 mm along the side of the equipped vehicle.

22. The vehicular ground illumination module of claim 21, wherein, when the ground illumination LED is electrically powered to emit light and with the vehicular ground illumination module mounted at the side of the equipped vehicle, light emitted by the ground illumination LED passes through the freeform optic to illuminate the ground illumination region of the ground at an intensity of at least 4 lux, and light emitted by the ground illumination LED passes through the freeform optic to illuminate the icon region of the ground at an intensity of less than 4 lux.

23. The vehicular ground illumination module of claim 20, wherein, responsive to the first and second inputs being generated together, the vehicular ground illumination module initially electrically individually powers the icon LEDs for an initial period of time prior to electrically powering the ground illumination LED.

24. The vehicular ground illumination module of claim 20, wherein the first and second inputs comprise inputs generated by a passive entry system of the equipped vehicle.

25. A vehicular ground illumination module, the vehicular ground illumination module configured for mounting at a vehicle, the vehicular ground illumination module comprising:
- a plurality of light emitting diodes (LEDs) comprising a ground illumination LED, a first icon LED, a second icon LED and a third icon LED;
- a freeform optic associated with the ground illumination LED;
- a first icon mask associated with the first icon LED, a second icon mask associated with the second icon LED and a third icon mask associated with the third icon LED;
- a housing and a printed circuit board disposed in the housing, wherein the first, second and third icon LEDs are disposed at the printed circuit board, and wherein the first, second and third icon masks are disposed between the printed circuit board and at least one projection lens at the housing;
- wherein the at least one projection lens comprises the freeform optic associated with the ground illumination LED;
- wherein, with the vehicular ground illumination module mounted at a side of a vehicle equipped with the vehicular ground illumination module and when the ground illumination LED is electrically powered to emit light, light emitted by the ground illumination LED passes through the freeform optic to illuminate the ground adjacent and along the side of the equipped vehicle at which the vehicular ground illumination module is mounted;
- wherein the freeform optic is formed so that, with the vehicular ground illumination module mounted at the side of the equipped vehicle, light emitted by the ground illumination LED that passes through the freeform optic illuminates a ground illumination region of the ground adjacent and along the side of the equipped vehicle at a ground illumination intensity and illuminates an icon region of the ground at an icon illumination intensity, and wherein the ground illumination intensity is greater than the icon illumination intensity;

wherein, with the vehicular ground illumination module mounted at the side of the equipped vehicle and when the first icon LED is electrically powered to emit light, light emitted by the first icon LED passes through the first icon mask to project a first projected image onto the icon region of the ground;

wherein, with the vehicular ground illumination module mounted at the side of the equipped vehicle and when the second icon LED is electrically powered to emit light, light emitted by the second icon LED passes through the second icon mask to project a second projected image onto the icon region of the ground;

wherein, with the vehicular ground illumination module mounted at the side of the equipped vehicle and when the third icon LED is electrically powered to emit light, light emitted by the third icon LED passes through the third icon mask to project a third projected image onto the icon region of the ground;

wherein the first, second and third icon LEDs are individually electrically powered so that the first, second and third projected images provide animated images projected onto the icon region of the ground;

wherein the first icon LED is not electrically powered when the second icon LED or the third icon LED is electrically powered, and wherein the second icon LED is not electrically powered when the first icon LED or the third icon LED is electrically powered;

wherein the ground illumination LED is electrically powered responsive to a first input and the first, second and third icon LEDs are individually electrically powered responsive to a second input; and wherein the first and second inputs comprise inputs generated by a passive entry system of the equipped vehicle.

26. The vehicular ground illumination module of claim 25, comprising a condenser disposed between the printed circuit board and the first, second and third icon masks.

27. The vehicular ground illumination module of claim 25, wherein the at least one projection lens disposed between the icon masks and a cover element, wherein the at least one projection lens is configured to project light that passes through each of the first, second and third icon masks toward the icon region of the ground.

28. The vehicular ground illumination module of claim 25, wherein the ground illumination LED is disposed at the printed circuit board.

29. The vehicular ground illumination module of claim 25, wherein the ground illumination LED is disposed at a second printed circuit board disposed in the housing.

30. The vehicular ground illumination module of claim 29, wherein the ground illumination LED is closer to the at least one projection lens than the first, second and third icon LEDs.

31. The vehicular ground illumination module of claim 25, wherein, when the ground illumination LED is electrically powered to emit light and with the vehicular ground illumination module mounted at the side of the equipped vehicle, light emitted by the ground illumination LED passes through the freeform optic to illuminate the ground illumination region of the ground at an intensity of at least 4 lux, and light emitted by the ground illumination LED passes through the freeform optic to illuminate the icon region of the ground at an intensity of less than 4 lux.

32. The vehicular ground illumination module of claim 25, wherein, responsive to the first and second inputs being generated together, the vehicular ground illumination module initially electrically individually powers the icon LEDs for an initial period of time prior to electrically powering the ground illumination LED.

33. The vehicular ground illumination module of claim 25, wherein the first projected image is projected at the icon region at an intensity greater than the icon illumination intensity, and wherein the second projected image is projected at the icon region at an intensity greater than the icon illumination intensity, and wherein the third projected image is projected at the icon region at an intensity greater than the icon illumination intensity.

34. The vehicular ground illumination module of claim 25, wherein the illuminated icon region is at least partially surrounded by the illuminated ground illumination region of the ground adjacent and along the side of the equipped vehicle.

\* \* \* \* \*

UNITED STATES PATENT AND TRADEMARK OFFICE
CERTIFICATE OF CORRECTION

PATENT NO. : 11,285,866 B2
APPLICATION NO. : 16/947771
DATED : March 29, 2022
INVENTOR(S) : Justin E. Sobecki et al.

Page 1 of 1

It is certified that error appears in the above-identified patent and that said Letters Patent is hereby corrected as shown below:

In the Specification

Column 1
Line 10, "PCT/162017/057462" should be --PCT/IB2017/057462--

Signed and Sealed this
Tenth Day of May, 2022

Katherine Kelly Vidal
*Director of the United States Patent and Trademark Office*